(12) United States Patent
Kumagai et al.

(10) Patent No.: US 7,822,541 B2
(45) Date of Patent: Oct. 26, 2010

(54) MAP CREATION DEVICE AND NAVIGATION DEVICE

(75) Inventors: Shunichi Kumagai, Saitama (JP); Hajime Adachi, Saitama (JP); Reiji Matsumoto, Saitama (JP); Takuya Hirose, Saitama (JP); Masayoshi Suzuki, Saitama (JP)

(73) Assignees: Pioneer Corporation, Tokyo (JP); Pioneer System Technologies Corporation, Sendai-Shi (JP)

( * ) Notice: Subject to any disclaimer, the term of this patent is extended or adjusted under 35 U.S.C. 154(b) by 999 days.

(21) Appl. No.: 10/594,728

(22) PCT Filed: Mar. 24, 2005

(86) PCT No.: PCT/JP2005/005419

§ 371 (c)(1),
(2), (4) Date: Nov. 29, 2006

(87) PCT Pub. No.: WO2005/098793

PCT Pub. Date: Oct. 20, 2005

(65) Prior Publication Data

US 2007/0200845 A1 Aug. 30, 2007

(30) Foreign Application Priority Data

Mar. 31, 2004 (JP) ............................. 2004-104301

(51) Int. Cl.
*G01C 21/00* (2006.01)
*G09B 29/00* (2006.01)

(52) U.S. Cl. ........................................ 701/208; 345/419
(58) Field of Classification Search ...................... None
See application file for complete search history.

(56) References Cited

U.S. PATENT DOCUMENTS 6,177,943 B1 * 1/2001 Margolin .................... 345/419

(Continued)

FOREIGN PATENT DOCUMENTS

EP 1 107 189 A2 6/2001

(Continued)

OTHER PUBLICATIONS

Kazuaki Shimada et al., "Sanjigen Computer Graphics Ni Yoru Iko Hyoji System", Information Processing Society of Japan Kenkyu Hokoku, vol. 2001, No. 51, May 25, 2001 925.05.01), pp. 25 to 32.

(Continued)

*Primary Examiner*—Michael J. Zanelli
(74) *Attorney, Agent, or Firm*—Young & Thompson

(57) ABSTRACT

A map creation device includes a simple-ground-information creating unit, an on-ground-structure-information creating unit, and a map-information creating unit. The simple-ground-information creating unit creates, based on the ground object, a simple ground object expressing the three-dimensional shape with less amount of data than the ground object. The on-ground-structure-information creating unit creates, based on the simple ground object, an on-ground-structure object expressing a three-dimensional shape of an on-ground structure that is present on a surface of the ground by adding height information to a two-dimensional on-ground-structure object expressing a two-dimensional shape of the on-ground structure. The map-information creating unit creates map information in which the on-ground-structure object is superimposed on the ground object.

13 Claims, 15 Drawing Sheets

U.S. PATENT DOCUMENTS

| | | |
|---|---|---|
| 2002/0075259 A1* | 6/2002 | Sakamoto et al. ............ 345/419 |
| 2003/0023412 A1* | 1/2003 | Rappaport et al. ............. 703/1 |
| 2003/0154021 A1 | 8/2003 | Delling et al. |
| 2004/0041805 A1* | 3/2004 | Hayano et al. ............... 345/419 |
| 2008/0089610 A1* | 4/2008 | Tao et al. ..................... 382/285 |

FOREIGN PATENT DOCUMENTS

| | | |
|---|---|---|
| EP | 1 357 362 A1 | 10/2003 |
| JP | 09-138136 | 5/1997 |
| JP | 11-232484 | 8/1999 |
| JP | 2001-109874 | 4/2001 |
| JP | 2001-305953 | 11/2001 |
| JP | 2003-185447 | 7/2003 |
| WO | 03/001460 | 1/2003 |

OTHER PUBLICATIONS

Ryu Shin et al., "Saisentan Gazo Eizo Seisei Shori Giho, CG Ni Yoru 3 Jigen Chizu Model Oyobi Hyogen Shuho No Kento", Gazo Joho Kogaku to Hoso Gijitsu, vol. 49, No. 10, Oct. 20, 1995, pp. 1259 to 1265.

* cited by examiner

● ···VERTEX OF POLYGON 202

● ··· VERTEX OF POLYGON 202

MAP CREATION DEVICE AND NAVIGATION DEVICE

TECHNICAL FIELD

The present invention relates to a map creation device, a navigation device, a map creation method, a map creation program, and a recording medium.

BACKGROUND ART

Conventionally, a vehicle navigation device with which a map can be displayed in three dimensions has been proposed. In the vehicle navigation device, a map detecting device reads out, from a map memory device, map data of an area around a current position of a vehicle calculated by a position calculating device or map data corresponding to a range of map designated by an input device. An arithmetic processing device performs perspective transformation of four vertices of the read-out map data, base on coordinates of the point of view and the point of gaze, mapping of the map data into the transformed coordinates, and clipping. Then, the arithmetic processing device causes an output device to display the map on which the mapping has been performed (refer to, for example, Patent Document 1).

Patent Document 1: Japanese Patent Laid-Open Publication No. H9-138136

DISCLOSURE OF INVENTION

Problem to be Solved by the Invention

However, in the vehicle navigation device according to Patent Document 1 described above, a road is expressed with link data regardless of width of the road to be pasted on a polygon plane of three-dimensional ground information as a texture. Therefore, it is impossible to realistically express a road having a width corresponding to a real geographical feature on the three-dimensional ground information.

On the other hand, if an object along a ground level such as a road object having a width corresponding to a real geographical feature is described on a three-dimensional ground object, all polygon planes in the three-dimensional ground object have to be taken into consideration, thereby causing enormous amount of calculation. Therefore, installation of a high performance CPU is necessary, resulting in increases in cost of the navigation device.

Means for Solving Problem

A map creation device according to one aspect of the invention includes a three-dimensional-ground-information memory unit that stores three-dimensional ground information indicating a three-dimensional shape of a ground; a simple-three-dimensional-ground-information creating unit that creates simple-three-dimensional ground information having less amount of data than the three-dimensional ground information, using the three-dimensional ground information stored by the three-dimensional-ground-information memory unit; a three-dimensional-on-ground-structure-information creating unit that creates, by adding height information to two-dimensional on-ground-structure information indicating a two-dimensional shape of an on-ground structure that is present on a surface of the ground, three-dimensional on-ground-structure information indicating a three-dimensional shape of the on-ground structure, using the simple-three-dimensional ground information created by the simple-three-dimensional-ground-information creating unit; and a three-dimensional-map-information creating unit that creates three-dimensional map information, based on the three-dimensional ground information stored by the three-dimensional-ground-information memory unit and the three-dimensional on-ground-structure information created by the three-dimensional-on-ground-structure creating unit.

A navigation device according to another aspect of the invention includes a three-dimensional-ground-information memory unit that stores three-dimensional ground information indicating a three-dimensional shape of a ground; a point-information input unit that receives an input of point information indicating an arbitrary point; a three-dimensional-ground-information extracting unit that extracts, from the three-dimensional ground information stored by the three-dimensional-ground-information memory unit, three-dimensional ground information indicating a three-dimensional shape of a ground within a predetermined range including the point information input by the point-information input unit; a simple-three-dimensional-ground-information creating unit that creates, using the three-dimensional ground information extracted by the three-dimensional-ground-information extracting unit, simple-three-dimensional ground information having less amount of data than the three-dimensional ground information; a three-dimensional-on-ground-structure information creating unit that creates, by adding height information to two-dimensional on-ground-structure information indicating a two-dimensional shape of an on-ground structure present on a surface of the ground within the range including the point information using the simple-three-dimensional ground information created by the simple-three-dimensional-ground-information creating unit, three-dimensional on-ground-structure information indicating a three-dimensional shape of the on-ground structure; a three-dimensional-map-information creating unit that creates three-dimensional map information, based on the three-dimensional ground information extracted by the three-dimensional-ground-information extracting unit and the three-dimensional on-ground-structure information created by the three-dimensional-on-ground-structure-information creating unit; a map display information creating unit that creates, using the three-dimensional map information, map display information viewed from a view position corresponding to a position of the point information; a display unit that includes a display; and a display-control unit that controls the display and displays a map screen using the map display information created by the map display information creating unit.

A map creation method according to yet another aspect of the invention includes a three-dimensional-ground-information inputting step of imputing three-dimensional ground information indicating a three-dimensional shape of a ground; a simple-three-dimensional-ground-information creating step of creating, using the three-dimensional ground information input at the three-dimensional-ground-information-inputting step, simple-three-dimensional ground information having less amount of data than the three-dimensional ground information; a three-dimensional-on-ground-structure-information-creating step of creating, by adding height information to two-dimensional on-ground-structure information indicating a two-dimensional shape of an on-ground structure present on a surface of the ground within the range including the point information using the simple-three-dimensional ground information created at the simple-three-dimensional-ground-information-creating step, three-dimensional on-ground-structure information indicating a three-dimensional shape of the on-ground structure; and a three-dimensional-map-information-creating step of creating three-dimensional map information, based on the three-dimensional ground information input at the three-dimensional-ground-information inputting step and the three-dimensional on-ground-structure information created at the three-dimensional-on-ground-structure-information creating step.

A map creation program according to the invention causes a computer to execute the map creation method.

A computer-readable recording medium according to the invention stores the map creation program.

EXPLANATIONS OF LETTERS OR NUMERALS

Figure 1:
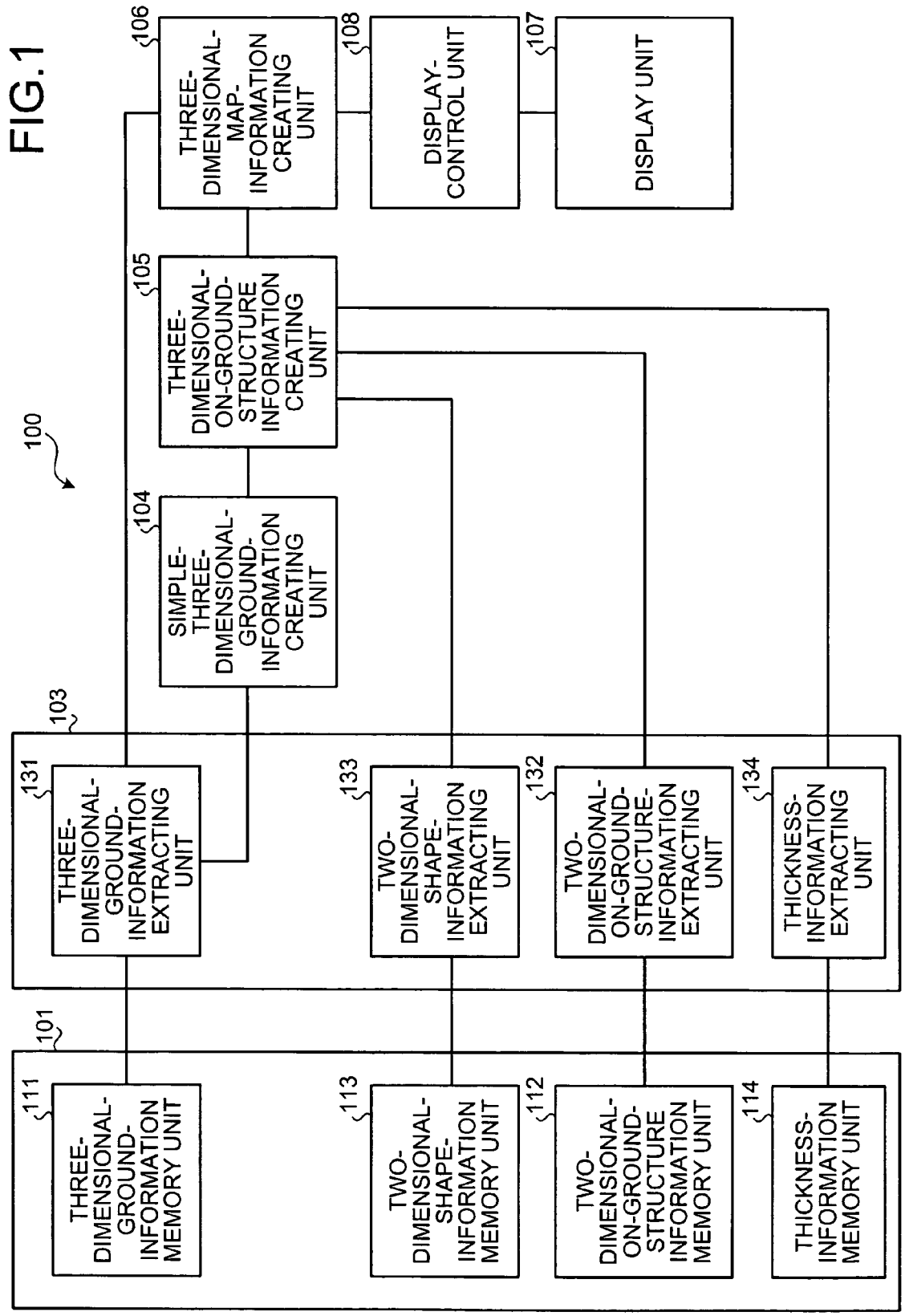
FIG. 1 is a block diagram of a functional configuration of a map creation device according to a first embodiment.

100 Map creation device
101 Memory unit
104 Simple-three-dimensional-ground information creating unit
105 Three-dimensional-on-ground-structure-information creating unit
106 Three-dimensional-map-information creating unit
107 Display unit
108 Display-control unit
200 Three-dimensional ground object
300, 800 Two-dimensional on-ground structure
400 Road-link data
600 Simple-three-dimensional ground object
900, 910 Three-dimensional on-ground structure
1000, 1100 Three-dimensional map information

BEST MODE(S) FOR CARRYING OUT THE INVENTION

Exemplary embodiments of a map creation device, a navigation device, a map creation method, a map creation program, and a recording medium according to the present invention will be explained in detail with reference to the accompanying drawings.

First Embodiment

A map creation device, a map creation method, a map creation program, and a recording medium will be explained in a first embodiment.

(Functional Configuration of Map Creation Device)

A functional configuration of a map creation device according to the first embodiment will be explained. FIG. 1 is a block diagram of a functional configuration of a map creation device according to the first embodiment. As shown in FIG. 1, a map creation device 100 includes a memory unit 101, an extracting unit 103, a simple-three-dimensional-ground-information creating unit 104, a three-dimensional-on-ground-structure-information creating unit 105, a three-dimensional-map-information creating unit 106, a display unit 107, and a display-control unit 108.

The memory unit 101 includes a three-dimensional-ground-information memory unit 111, a two-dimensional on-ground-structure-information memory unit 112, a two-dimensional-shape-information memory unit 113, and a thickness-information memory unit 114. The three-dimensional-ground-information memory unit 111 stores three-dimensional ground information. Three-dimensional ground information indicates a stereoscopic object (hereinafter, a "three-dimensional ground object") to display a ground image indicating a three-dimensional shape of a ground on a display in pseudo three dimensions.

Figure 2:
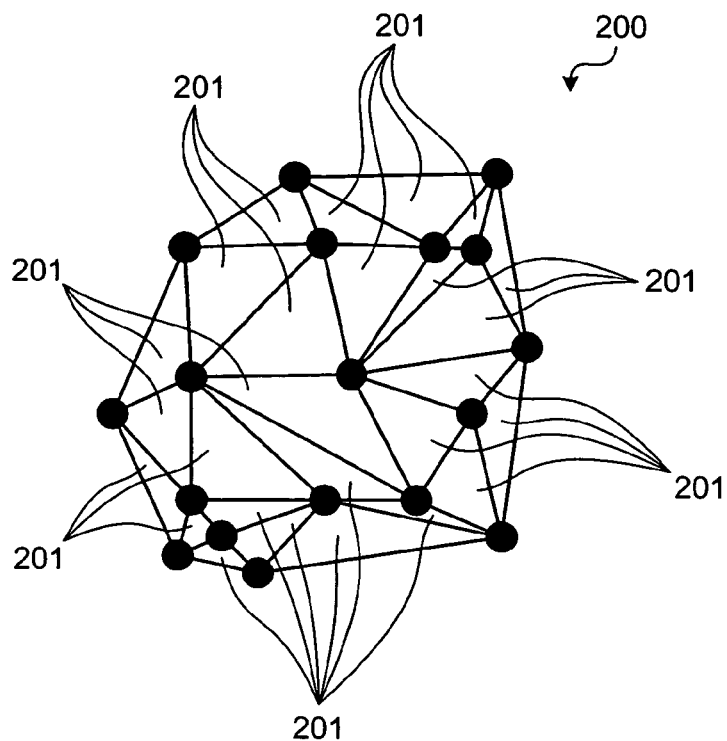
FIG. 2 is an explanatory view for illustrating an example of a three-dimensional ground object.

FIG. 2 is an explanatory view for illustrating an example of a three-dimensional ground object. As shown in FIG. 2, a three-dimensional ground object 200 includes mesh data in which plural polygons 201 are connected. Each vertex 202 of the polygon 201 has height information indicating the height of a ground. Each polygon 201 indicates the surface of the ground that is inclined off a horizontal surface.

Referring back to FIG. 1, the two-dimensional-on-ground-structure-information memory unit 112 stores two-dimensional on-ground-structure information. Two-dimensional on-ground-structure information indicates a plane object (hereinafter, a "two-dimensional on-ground-structure object") indicating two-dimensional shape of an on-ground structure present on the surface of a ground. The "on-ground structure" includes a traffic route and a facility. The traffic route includes a road such as a roadway, a sidewalk, a bridge, etc., a railroad and a railroad bridge of a train, etc. The facility includes a lane, a city block, and green space on the traffic route. Furthermore, the "on-ground structure" includes a natural formed such as a road, a river, etc. formed on the surface of a ground.

Figure 3:
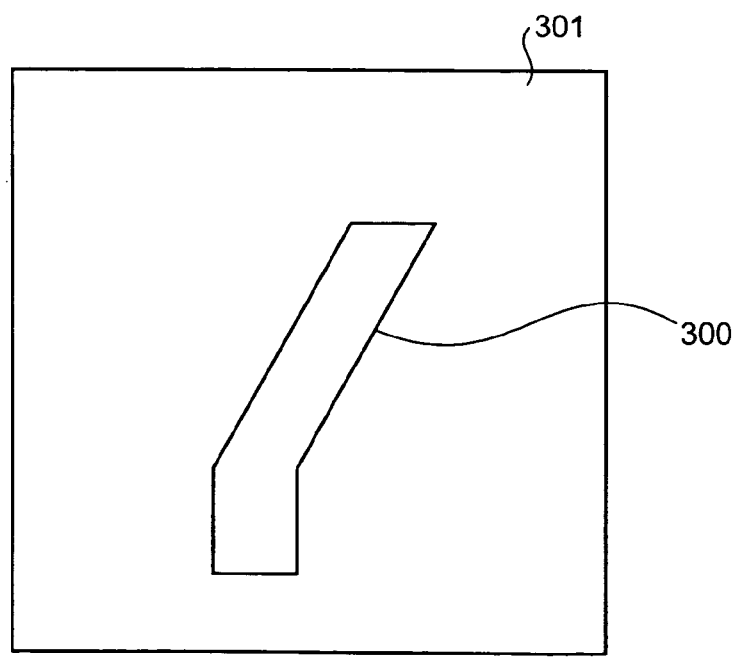
FIG. 3 is an explanatory view for illustrating an example of a two-dimensional on-ground-structure object.

More specifically, the two-dimensional on-ground-structure object is a two-dimensional on-ground structure to display an on-ground structure image on the display in pseudo two dimensions. FIG. 3 is an explanatory view for illustrating an example of a two-dimensional on-ground-structure object. A two-dimensional on-ground-structure object 300 is present within an arbitrary range 301. The two-dimensional on-ground-structure object 300 indicates a road object. The two-dimensional on-ground-structure object 300 includes position information (for example, latitude and longitude information), and the position information corresponds to the three-dimensional ground object 200.

The two-dimensional-shape-information memory unit 113 stores two-dimensional shape information. The two-dimensional on-ground-structure information described above is created from the two-dimensional shape information. More specifically, the two-dimensional shape information includes a reference-line information indicating a reference line of the two-dimensional shape of the on-ground structure described above, and width information indicating the width of the two-dimensional shape of the on-ground structure. The reference-line information indicates, for example, road-link data including a node and a link. Note that a node includes, besides a node at an end-point of a link, a shape-supplementing point at a mid-point of a link to supplement the shape of a link.

Figure 4:
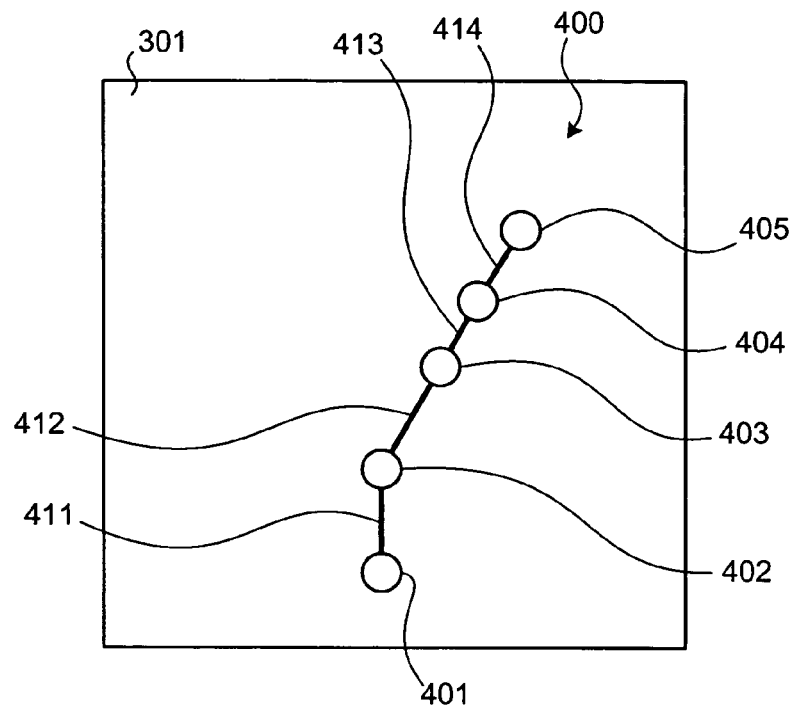
FIG. 4 is an explanatory view of road-link data.

FIG. 4 is an explanatory view of road-link data. As shown in FIG. 4, road-link data 400 is present within an arbitrary range 301. The road-link data 400 including five nodes 401 to 405 and four links 411 to 414 is shown in FIG. 4 as an example. The width information indicates the width of a road. When width information of all of real roads is set, an amount of the data becomes enormous. Therefore, width information of each type of roads may be set instead of real width information, or width information corresponding to traffic lanes may be set. The two-dimensional shape information includes position information (for example, latitude and longitude information), and the position information corresponds to the three-dimensional ground information.

The thickness information memory unit 114 shown in FIG. 1 stores thickness information. The thickness information is information indicating the thickness of the two-dimensional shape of an on-ground structure in the height direction. More specifically the thickness information is information with which the two-dimensional on-ground-structure object 300 is extended in parallel in the height direction. Single reference value of the thickness information may be set for all roads, or several reference values may be set for regions, etc. More specifically, the thickness information may be adjusted to be larger than the reference value for a region having a large amount of ground data and an undulating region, so that the two-dimensional on-ground-structure object 300 becomes thick.

The extracting unit 103 includes a three-dimensional-ground-information extracting unit 131, a two-dimensional-on-ground-structure-information extracting unit 132, a two-dimensional-shape-information extracting unit 133, and a thickness-information extracting unit 134. The three-dimensional-ground-information extracting unit 131 extracts three-dimensional ground object 200, from three-dimensional ground objects stored in the three-dimensional-ground-information memory unit 111.

The two-dimensional-on-ground-structure-information extracting unit 132 extracts the two-dimensional on-ground-structure object 300, from three-dimensional ground objects stored in the three-dimensional-ground-information memory unit 111. The two-dimensional-shape-information extracting unit 133 extracts two-dimensional shape information, from two-dimensional shape information stored in the two-dimensional-shape-information memory unit 113. The thickness-information extracting unit 134 extracts thickness information corresponding to two-dimensional shape information, from thickness information stored in the thickness-information memory unit 114.

The simple-three-dimensional-ground-information creating unit 104 creates, using three-dimensional ground information stored in the three-dimensional-ground-information memory unit 111, simple-three-dimensional ground information having less data than the three-dimensional ground information. The simple three-dimensional-ground-information creating unit 104 also creates, by applying the three-dimensional ground information to two-dimensional rectangle information indicating two-dimensional plane split into polygons (for example, rectangles), three-dimensional rectangle information including height information added to vertices of polygons (for example, rectangles), as the simple three-dimensional ground information.

Furthermore, the simple-three-dimensional-ground-information creating unit 104 may generate the simple-three-dimensional ground information, using a mean value of height information of the three-dimensional ground information present near vertices of polygons (for example, rectangles) as height information of the rectangles. Making the shape of a two-dimensional plane into a rectangle makes it possible to simply calculate height information other than vertices. Furthermore, even when the shape of a two-dimensional plane is other than a polygon, a two-dimensional plane having small amount of data may be employed. An example of creating the simple-three-dimensional ground information will be explained later.

The simple-three-dimensional ground information indicates a stereoscopic object (hereinafter, a "simple-three-dimensional ground object") having less amount of data than the three-dimensional ground object 200 stored in the three-dimensional-ground-information memory unit 111. For example, when the three-dimensional ground object 200 is represented by mesh data in which plural polygons 201 are connected, mesh data having less number of vertices than the number of vertices of the polygons 201 may be created as the simple-three-dimensional ground object.

The three-dimensional-on-ground-structure-information creating unit 105 creates, using the simple-three-dimensional ground information created, three-dimensional on-ground-structure information indicating a three-dimensional shape of the on-ground structure information by adding height information to two-dimensional on-ground-structure information indicating a two-dimensional shape of the on-ground structure present on the surface of a ground. For example, the two-dimensional on-ground-structure object 300 can be converted into three-dimensional on-ground-structure object that expresses the two-dimensional on-ground-structure object 300 in three dimensions.

The three-dimensional-on-ground-structure-information creating unit 105 may generate three-dimensional on-ground-structure information using the two-dimensional shape information stored in the two-dimensional-shape-information memory unit 113 and the simple-three-dimensional ground information created by the simple-three-dimensional-ground-information creating unit 104. More specifically, when the reference line information included in the two-dimensional shape information is the road-link data 400 shown in FIG. 4, height information of the nodes included in the road-link data 400 is calculated and added to the nodes.

The node 202 to which the height information has been added is positioned on the plane of a polygon that is to be a simple-three-dimensional ground surface included in the simple-three-dimensional ground object. The road-link data 400 is formed on the simple-three-dimensional ground surface by connecting the nodes on the simple-three-dimensional ground surface and adding the width information. Thus, the two-dimensional shape information can be converted into the three-dimensional on-ground-structure object. The three-dimensional-on-ground-structure-information creating unit 105 creates, before adding the height information of the nodes to the nodes, a two-dimensional road object from the nodes and the links, and adds the height information to the nodes of the created two-dimensional road object.

Furthermore, when each of the three-dimensional on-ground-structure objects described above is drawn on the three-dimensional ground object 200, the height information obtained from the simple-three-dimensional ground object may be increased by predetermined amount in advance. Thus, the height of the three-dimensional on-ground-structure object becomes equal to or more than that of the ground surface of the three-dimensional ground object 200, and the three-dimensional on-ground structure object can be displayed superimposing on the three-dimensional ground object 200.

Instead of or besides the increase by predetermined amount, a thickness can be added to the three-dimensional on-ground-structure object using the thickness information stored in the thickness information memory unit 114. Thus, the height of the three-dimensional on-ground-structure object becomes equal to or more than that of the ground surface of the three-dimensional ground object 200, and the three-dimensional on-ground-structure object can be displayed superimposing on the three-dimensional ground object 200. Furthermore, a gap between the three-dimensional on-ground-structure object and the three-dimensional ground object 200 can be hided by the thickness.

The three-dimensional-map-information creating unit 106 creates three-dimensional map information based on the three-dimensional ground information stored in the three-dimensional-ground-information memory unit 111 and the three-dimensional on-ground-structure information created by the three-dimensional-on-ground-structure-information creating unit 105. More specifically, the three-dimensional ground object 200 is drawn, and the three-dimensional on-ground-structure object is drawn on the three-dimensional ground object 200 drawn. Thus, the three-dimensional map information in which the three-dimensional on-ground object is superimposed on the three-dimensional ground object 200.

The three-dimensional-map-information creating unit 106 can judge whether the three-dimensional on-ground-structure information is superimposed on the three-dimensional ground information. More specifically, the judgment is executed by comparing coordinates in the height direction between a point of the three-dimensional on-ground-structure object and a point of the three-dimensional ground object 200 those of which have the same two-dimensional plane coordinates.

When it is judged by the judgment that the height of the point of the three-dimensional on-ground-structure object is lower than that of the point of the three-dimensional ground object 200, difference information (level difference information) between the coordinates in the height direction is calculated. The calculated level difference information is added to the height information of the point of the three-dimensional on-ground-structure object. Thus, the three-dimensional on-ground-structure object along the ground surface of the three-dimensional ground object 200 can be superimposed to be displayed.

The display unit includes a display. The display-control unit 108 controls the display to display the three-dimensional map information created by the three-dimensional-map-information creating unit 106. More specifically, the three-dimensional map information within the arbitrary range 301 is coordinate-transformed into map display information viewed from a predetermined view position, and displayed on the display.

Figure 5:
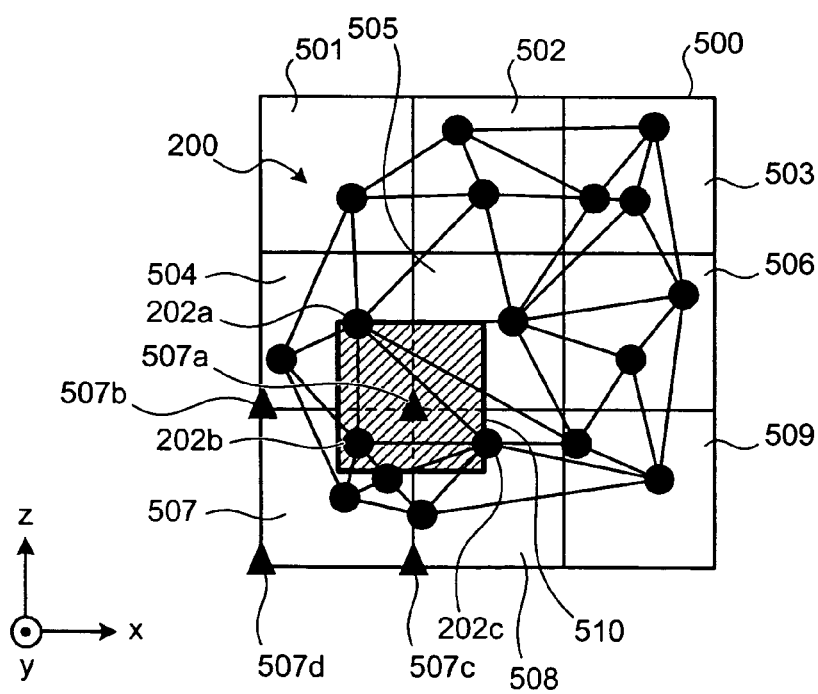
FIG. 5 is an explanatory view of a three-dimensional ground object present on two-dimensional rectangular information corresponding to a creation range.

An example of creating the simple-three-dimensional ground object from the three-dimensional ground object 200 including the mesh data described above will be explained. FIG. 5 is an explanatory view for illustrating the three-dimensional ground object 200 present on two-dimensional rectangle information 500 corresponding to the arbitrary range 301. As shown in FIG. 5, the three-dimensional ground object 200 includes 26 pieces of triangular polygons 201. The number of the vertices 202 is 18. The two-dimensional rectangle information 500 is equally split into 9 in the shape of a rectangle. The two-dimensional rectangle information split is called split-rectangle data 501 to 509.

The simple-three-dimensional-ground-information creating unit 104 calculates height information of the split-rectangle data 501 to 509 using the height information of the vertices 202 of the polygons 201 of the three-dimensional ground object 200 present near the split-rectangle data 501 to 509, respectively. A vertex 507*a* among four vertices 507*a* to 507*d* of the split-rectangle data 507 left below shown in FIG. 5 is taken as an example of explanation.

Range data 510 including the vertex 507*a* indicates a rectangular range (a hatched range shown in FIG. 5) with the center of the vertex 507*a*. The vertices 202*a*, 202*b* and 202*c* of the polygon 201 are included in the range data 510. Height information of the vertex 507*a* can be calculated as a mean value of height information of the vertices 202*a*, 202*b*, and 202*c*. A median value of the height information of the vertices 202*a*, 202*b*, and 202*c* may be extracted. The shape of the range data 510 is not limited to a rectangle, and may be, for example, a circle with the center of the vertex 507*a*.

Figure 6:
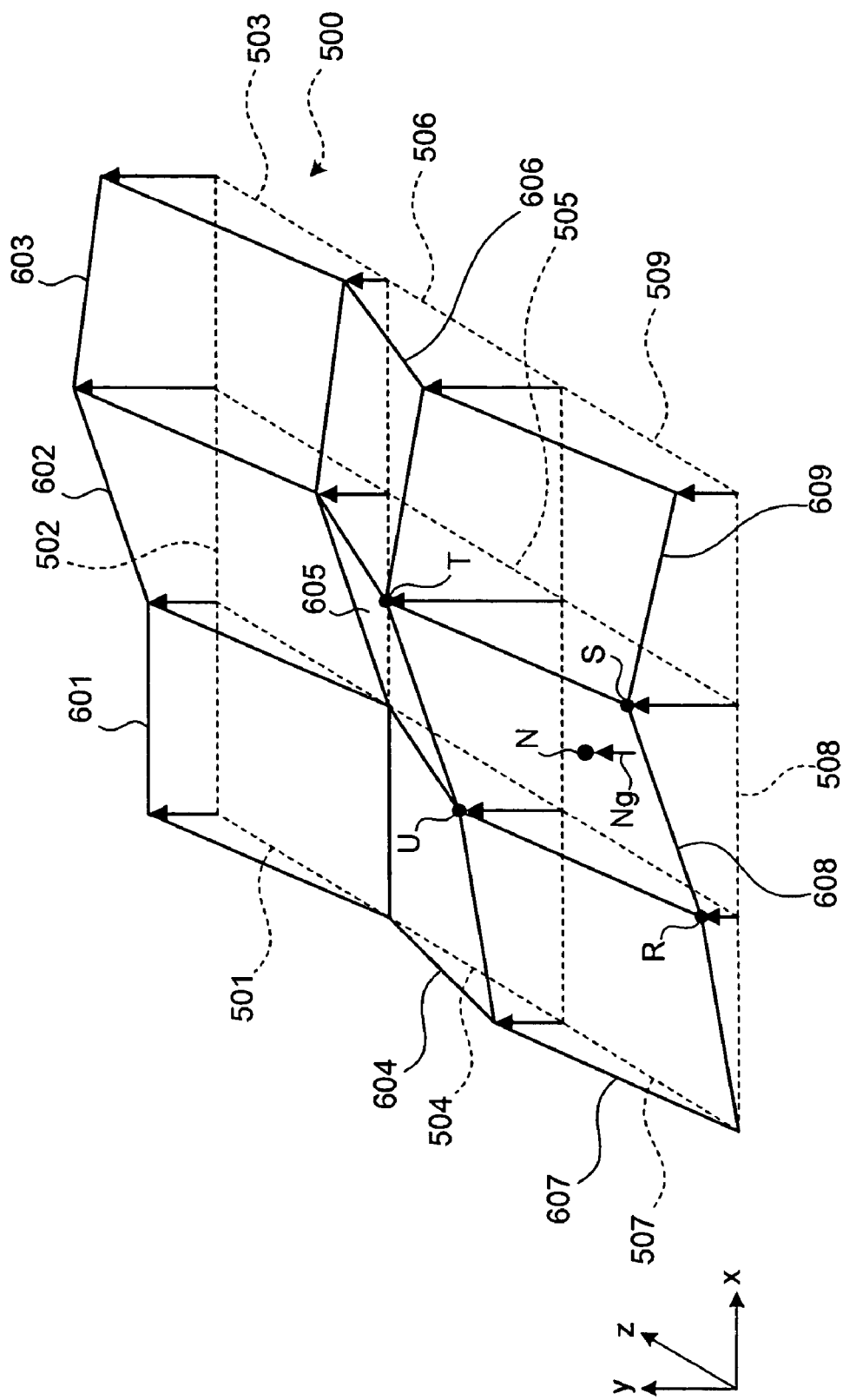
FIG. 6 is an explanatory view for illustrating a state of the two-dimensional rectangle information before and after transformation.

When height information of all of the split-rectangle data 501 to 509 are obtained, the height information are added to the vertices of the split-rectangle data 501 to 509, and the two-dimensional rectangle information 500 is transformed to generate the three-dimensional rectangle information. FIG. 6 is an explanatory view for illustrating a state of the two-dimensional rectangle information 500 before and after the transformation.

A figure drawn with dotted lines shown in FIG. 5 indicates the two-dimensional rectangle information 500 before the height information is added to each of the vertices of the split-rectangle data 501 to 509. A figure drawn with full lines indicates the two-dimensional rectangle information transformed by adding the height information to each of the vertices of the split-rectangle data 501 to 509, in other words, the three-dimensional rectangle information. The three-dimensional rectangle information becomes the simple-three-dimensional ground object 600. Rectangle data that is the split-rectangle data 501 to 509 to which the height information is added, is called split-three-dimensional rectangle data 601 to 609.

Figure 7:
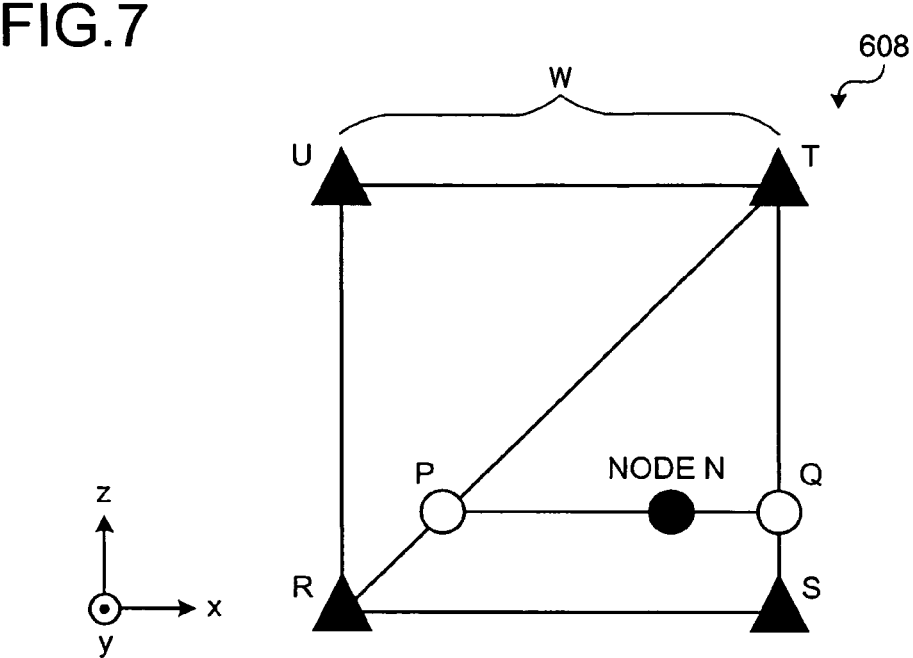
FIG. 7 is an explanatory view of split-three-dimensional rectangle information shown in FIG. 6.

An example of creating the three-dimensional on-ground-structure object using the road-link data 400 shown in FIG. 4 and the simple three-dimensional ground object 600 shown in FIG. 6 will be explained. FIG. 7 is an explanatory view of the split-three-dimensional rectangle data 608 shown in FIG. 6. As shown in FIGS. 6 and 7, each of four vertices R to U of the split-three-dimensional rectangle data 608 includes coordinates in the direction of x, y, and z.

Coordinates of the vertices R, S, T and U are (Rx, Ry, Rz), (Sx, Sy, Sz), (Tx, Ty, Tz), and (Ux, Uy, Uz), respectively. The height direction is the direction of y, therefore, the coordinate values Ry to Uy of the four vertices R to U in the height direction are identical to the height information added with the method explained with reference to FIG. 5. The point N in the split-three-dimensional rectangle data 608 is a node 401 of the road-link data 400 to be drawn on the split-three-dimensional rectangle data 608. As the height information of the four vertices R to U of the split-three-dimensional rectangle data 608 are known, height information Ny of the point N (the coordinate of N is (Nx, Ny, Nz)) that is the node 401 can be calculated using ratio.

An example of a method of calculating the height information Ny of the point N will be explained. For example, a point P is defined as a point of intersection of a line segment including the point N in parallel with the direction of x and a side ST, and a point Q is defined as a point of intersection of a line segment including the point N in parallel with the direction of x and a side ST. Coordinates of the points P and Q are defined as (Px, Py, Pz) and (Qx, Qy, Qz), respectively. The height information Ny of the point N can be calculated as follows.

The point P having the same coordinate of z as the point N on a diagonal line RT, and the point Q having the same coordinate of z as the point N on the side ST are obtained. The coordinate of x and y of the point P is obtained from the coordinates of the vertices R and T. The coordinate of x and y of the point Q is obtained from the coordinates of the vertices S and T. Thus, the coordinate of the point N can be obtained from the coordinates of the point P and Q.

Figure 8:
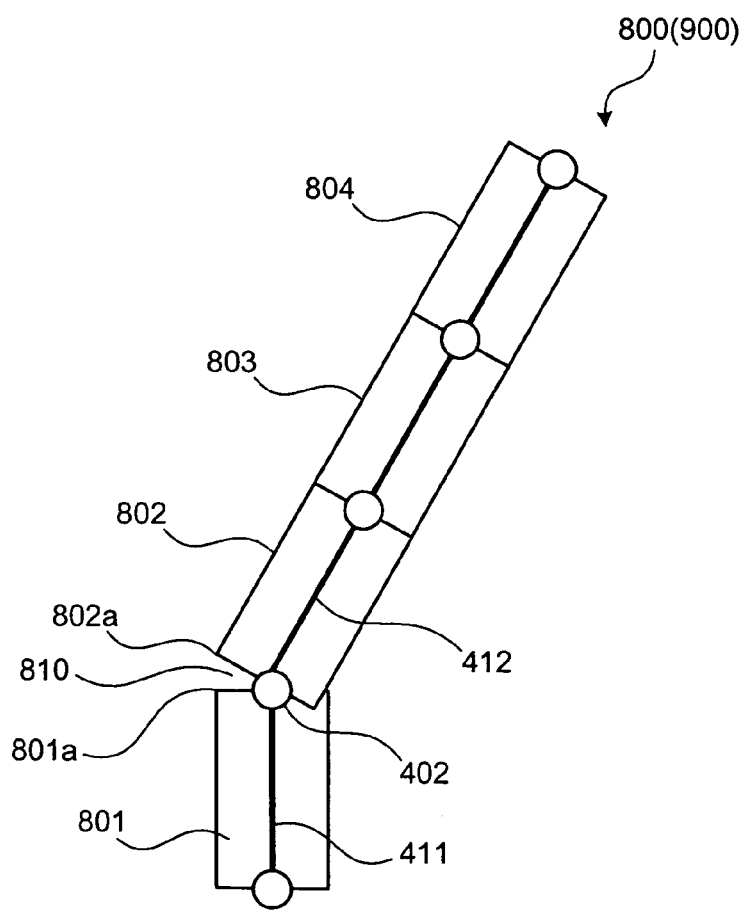
FIG. 8 is an explanatory view of an example of creating two-dimensional on-ground-structure using two-dimensional shape information.

An example of creating the two-dimensional on-ground-structure object using the two-dimensional shape information stored by the two-dimensional-shape-information memory unit 113 will be explained. FIG. 8 is an explanatory view of an example of creating two-dimensional on-ground-structure object using the two-dimensional shape information. The road-link data 400 is used as the reference line information included in the two-dimensional shape information.

The road-link data 400 is extended in the direction perpendicular to each of the links 411 to 414 using the width information included in the two-dimensional shape information. The extended width is identical to or proportional to the width information (the length of the width). When the width information is width information on a four-track road, the extended width becomes two times wider than when the width information is width information on a two-track road.

Thus, a two-dimensional on-ground-structure object 800 including rectangular polygons 801 to 804 can be created. Note that the example of creating the two-dimensional on-ground-structure object 800 has been explained here, the height information of each of the nodes 401 to 405 may be added in advance to each of the nodes 401 to 405 of the road-link data 400. Thus, a three-dimensional on-ground-structure object 900 in which the height information of each of the nodes 401 to 405 is added to the two-dimensional on-ground-structure object 800 can be created.

Figure 9:
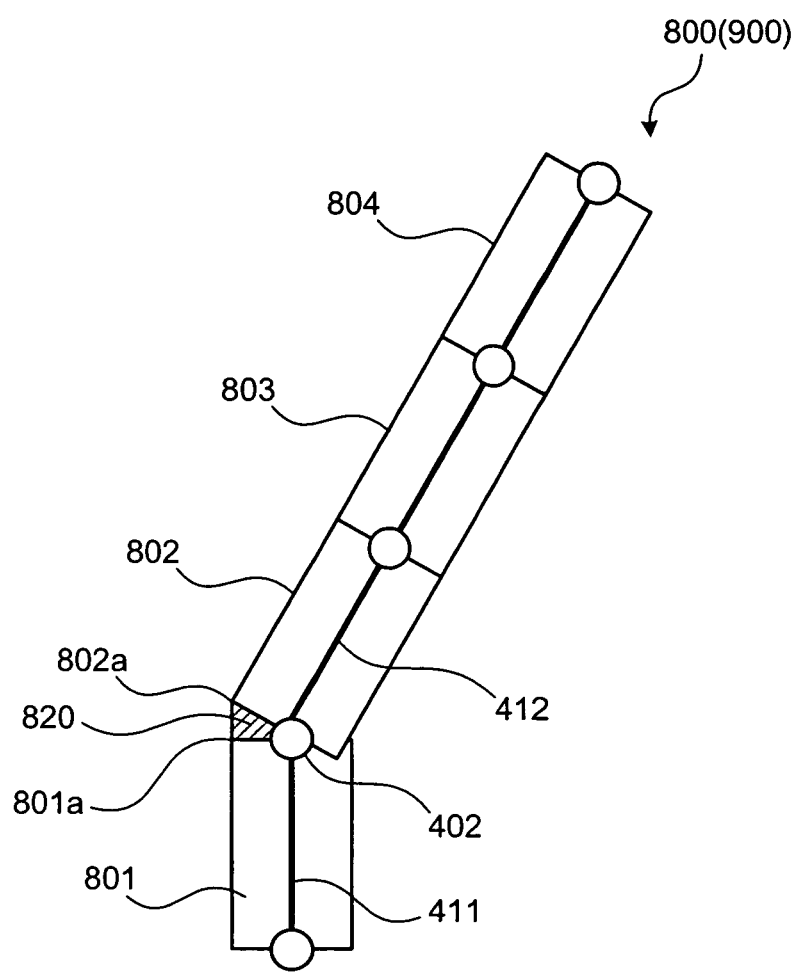
FIG. 9 is an explanatory view for illustrating an example of supplementing a joint between rectangular polygons.

An example of supplementing joints among the rectangular polygons 801 to 804 included in the two-dimensional on-ground-structure object 800 (or the three-dimensional on-ground-structure object 900). FIG. 9 is an explanatory view for illustrating an example of supplementing a joint among rectangular polygons. As shown in FIG. 8, when the links 411 and 412 that are connected to each other are not parallel with each other, the vertex 801*a* of the polygon 801 and the vertex 802*a* of the polygon 802 become separate, and a triangle space 810 including the vertices 801*a* and 802*a* and the node 402 is formed. In this case, a supplementing triangle polygon 820 having the same shape as the triangle space 810 is formed from the coordinates of the vertex 801*a* and 802*a* and the node 402 as shown in FIG. 9.

Figure 10:
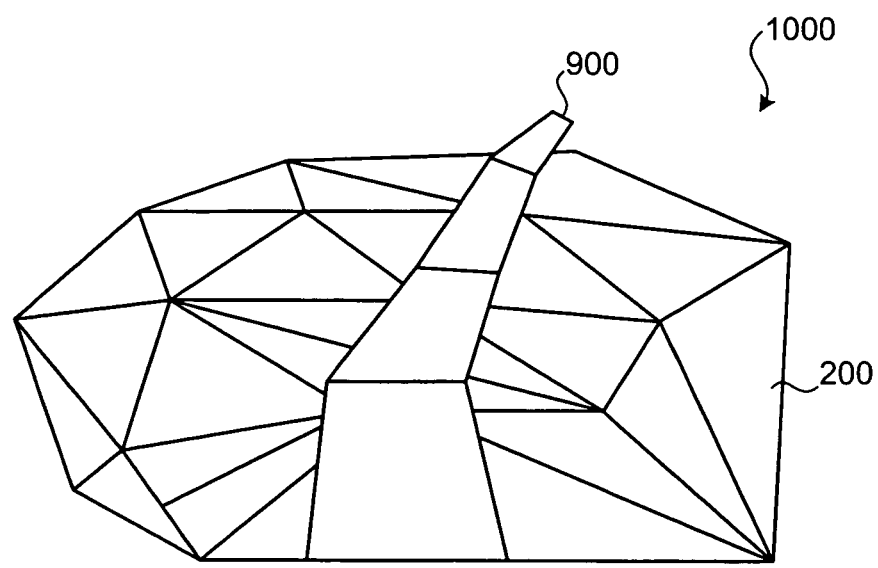
FIG. 10 is an explanatory view of an example of three-dimensional map information created by the three-dimensional-map-information creating unit shown in FIG. 1.
Figure 11:
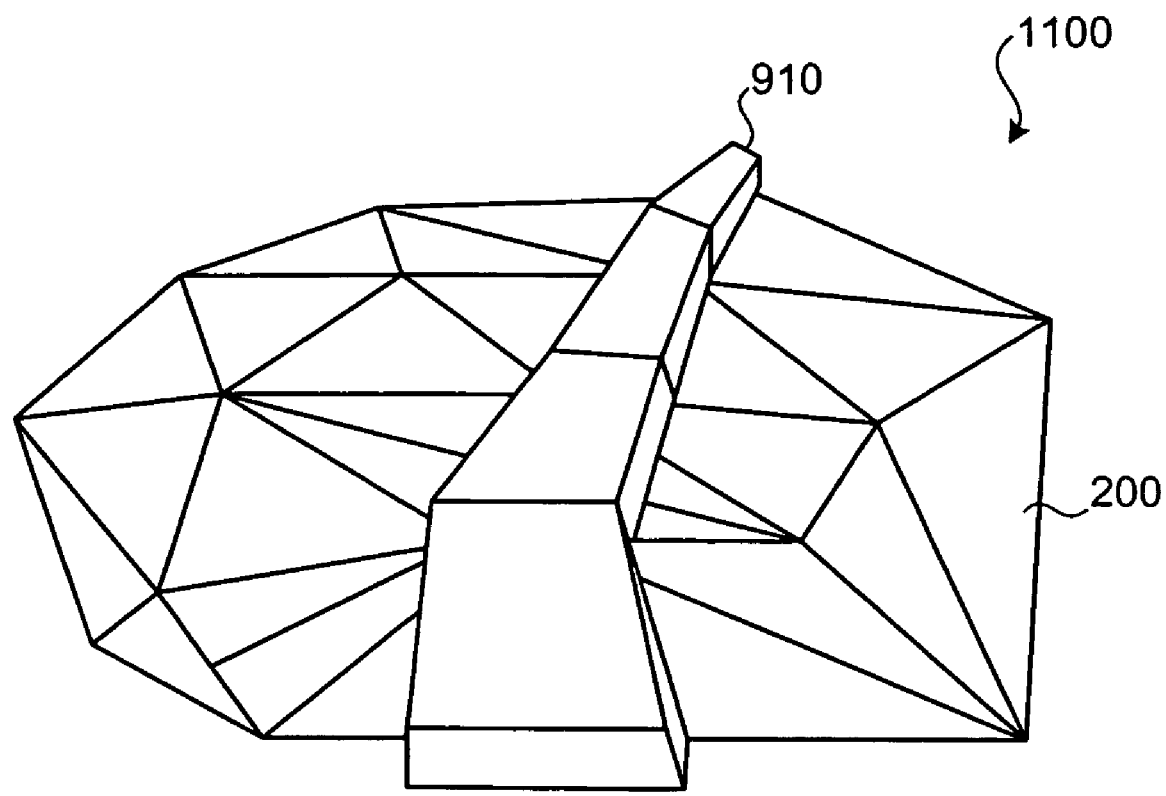
FIG. 11 is an explanatory view of another example of the three-dimensional map information created by the three-dimensional-map-information creating unit shown in FIG. 1.

The three-dimensional map information created by the three-dimensional-map-information creating unit 106 shown in FIG. 1 will be explained. FIG. 10 is an explanatory view of an example of the three-dimensional map information created by the three-dimensional-map-information creating unit 106 shown in FIG. 1. As shown in FIG. 10, three-dimensional map information 1000 is drawn such that the three-dimensional on-ground-structure object 900 is superimposed on the three-dimensional ground object 200. FIG. 11 is an explanatory view of another example of the three-dimensional map information created by the three-dimensional-map-information creating unit 106 shown in FIG. 1. In three-dimensional map information 1100 shown in FIG. 11, a three-dimensional on-ground-structure object 910 that is the three-dimensional on-ground-structure object 900 to which the width information is added, is drawn on the three-dimensional ground object 200.

(Hardware Configuration of Map Creation Device)

Figure 12:
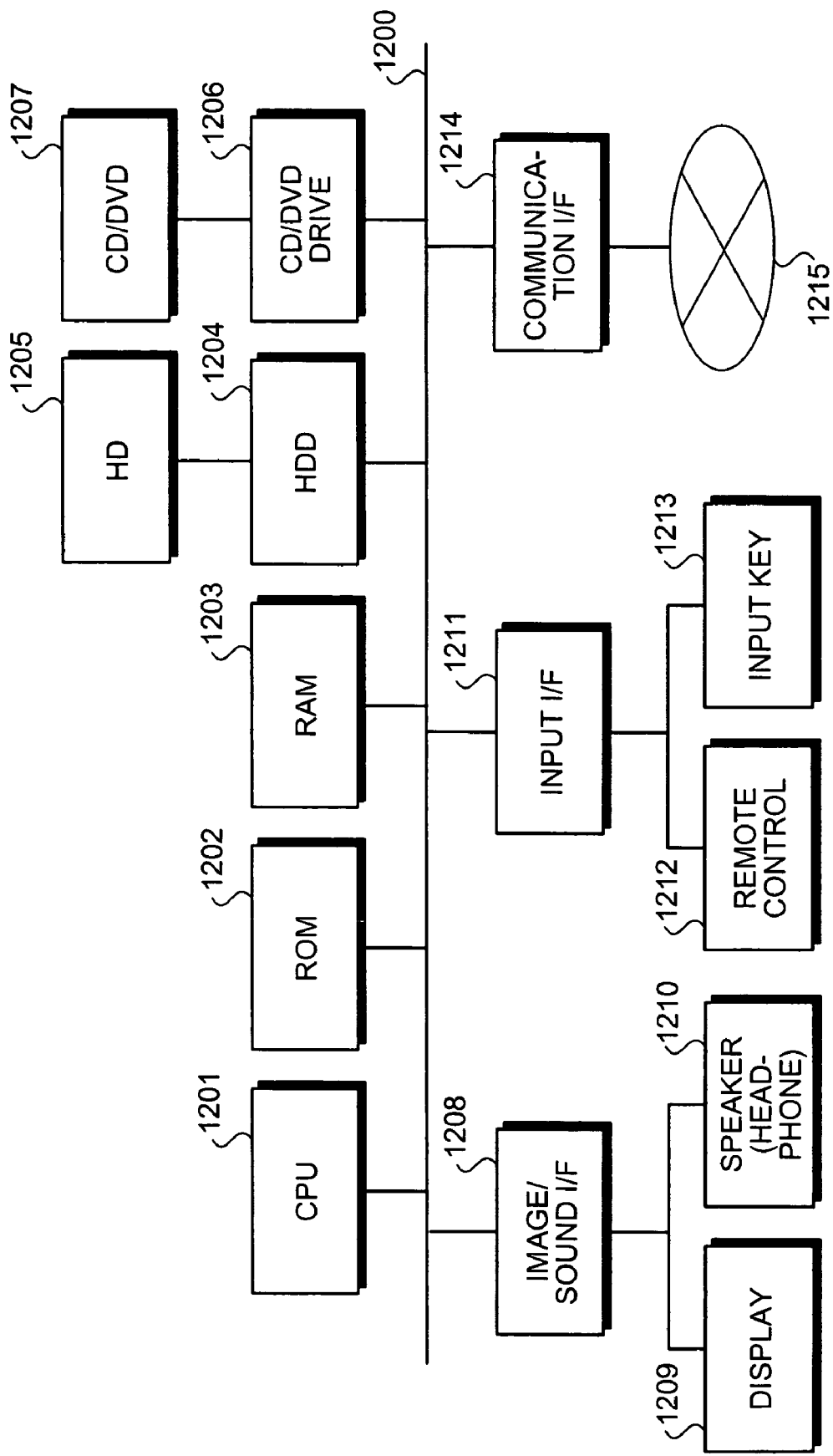
FIG. 12 is an explanatory view of a hardware configuration of the map creation device shown in FIG. 1.

A hardware configuration of the map creation device 100 shown in FIG. 1 will be explained. FIG. 12 is an explanatory view of the hardware configuration of the map creation device 100 shown in FIG. 1. As shown in FIG. 12, the map creation device 100 includes a CPU 1201, a ROM 1202, a RAM 1203, a HDD 1204, a HD 1205, a CD/DVD drive 1206, a CD/DVD 1207 as an example of a removable recording medium, an image/sound I/F 1208, a display 1209, a speaker (a headphone) 1210, an input I/F 1211, a remote control 1212, input keys 1213, a communication I/F 1214. Each component is connected via a bus 120.

The CPU 1201 controls the entire map creation device 100. The ROM 1202 stores a program such as a boot program. The RAM 1203 is used as a work area of the CPU 1201. The HDD 1204 controls reading/writing of data from/to the HD 1205 under the control of the CPU 1201. The HD 1205 stores data that is written into the HD 1205 under the control of the HDD 1204.

The CD/DVD drive 1206 controls reading/writing of data from/to the CD/DVD 1207 under the control of the CPU 1201. The CD/DVD 1207 is a removable recording medium, and data that is stored into the CD/DVD 1207 under the control of the CD/DVD drive 1206 is read from the CD/DVD 1207. A writable recording medium may be used as the CD/DVD 1207. A CD-ROM (CD-R, CD-RW), an MO, a memory card, etc. may be used as the removable recording medium besides the CD/DVD 1207.

The image/sound I/F 1208 is connected to the display 1209 used for displaying images and the headphone (the speaker) 1210 used for outputting sound. The display 1209 displays not only a cursor, an icon, and a tool box, but also data such as documents, images, etc. For example, a CRT, a TFT liquid crystal display, a plasma display can be employed as the display 1209.

The input I/F 1211 inputs data transmitted from the remote control including plural keys to input characters, numbers, various instructions, etc. and the input keys (including a keyboard, a mouse, etc.) 1213. An output I/F (not shown) may be provided as needed, so that a scanner that optically reads a character and an image and a printer that prints out a character and an image may be connected via the output I/F.

The communication I/F 1214 is connected to a network 1215 via radio transmission or communication cable, and functions as an interface between the network 1215 and the CPU 1201. The network 1215 includes a LAN, a WAN, a public line network, a cellular phone network, etc.

The memory unit 101 shown in FIG. 1 can include a recording medium such as the ROM 1202, the RAM 1203, the HD 1205, the CD/DVD 1207, etc. The extracting unit 103, the simple-three-dimensional-ground-information creating unit 104, the three-dimensional-on-ground-structure-information creating unit 105, the three-dimensional-map-information creating unit 106, and the display-control unit 108 can be realized by the CPU 1201 that executes a program stored in the ROM 1202. The display unit 107 shown in FIG. 1 can include the display 1209.

First Example

Figure 13:
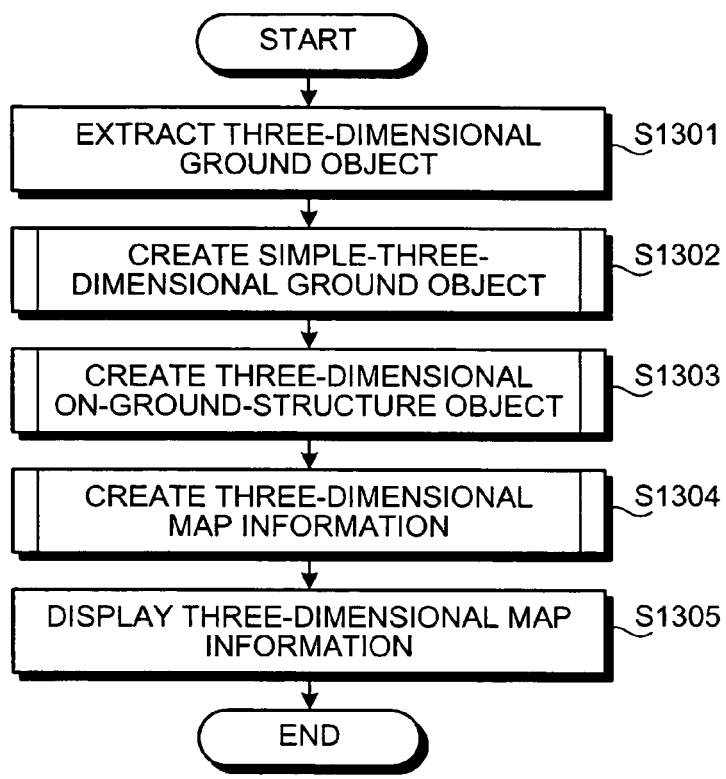
FIG. 13 is a flowchart of a procedure of a three-dimensional map information creating process performed by the map creation device according to the first embodiment.

A first example of the first embodiment described above will be explained. A procedure of creating three-dimensional map information performed by the map creation device 100 according to the first embodiment is explained in the first example. FIG. 13 is a flowchart of a procedure of creating three-dimensional map information performed by the map creation device 100 according to the first embodiment. As shown in FIG. 13, the three-dimensional ground object 200 is extracted (step S1301).

Then, the simple-three-dimensional ground object 600 is created using the three-dimensional ground object 200 extracted (step S1302). Then, the three-dimensional on-ground-structure object 900 is created using the simple-three-dimensional ground object 600 created (step S1203). Then, the three-dimensional map information 1000 is created using the three-dimensional ground object 200 extracted at the step S1301 and the three-dimensional on-ground-structure object 900 created (step S1304).

Figure 14:
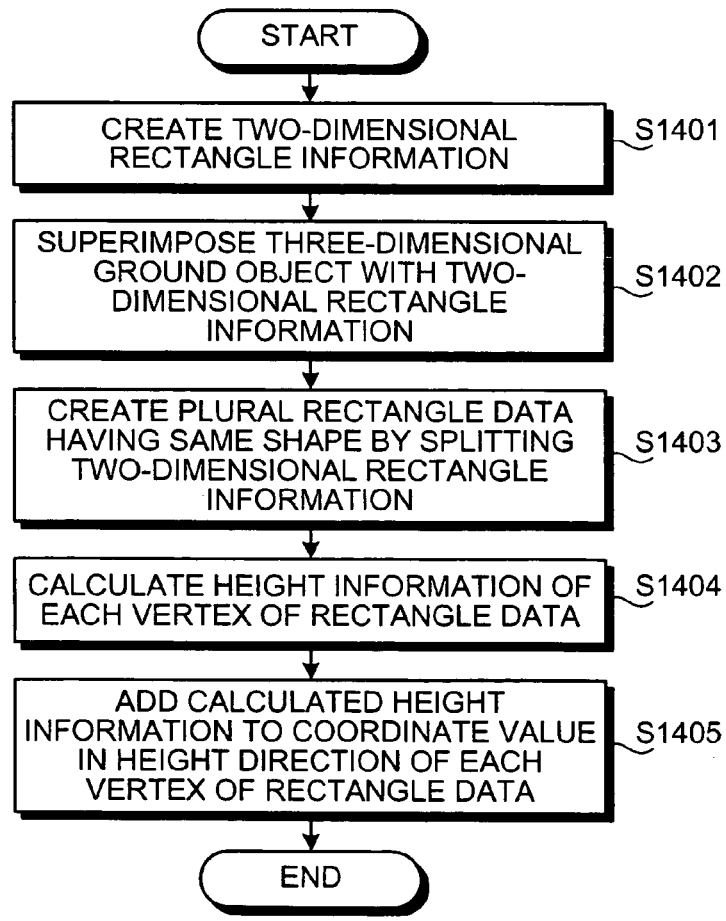
FIG. 14 is a flowchart of a procedure of a simple-three-dimensional ground object creating process.

A procedure of creating a simple-three-dimensional ground object 600 shown at step S1302 will be explained. FIG. 14 is a flowchart of a procedure of creating the simple-three-dimensional ground object 600. As shown in FIG. 14, the two-dimensional rectangle information 500 is created (step S1401). When the two-dimensional rectangle information is stored in advance at this process, the two-dimensional rectangle information stored is extracted. Then, as shown in FIG. 5, the three-dimensional ground object 200 is superimposed on the two-dimensional rectangle information 500 (step S1402).

Then, the plural (nine in FIG. 5) rectangle data 501 to 509 having the same shape are created by splitting the two-dimensional rectangle information 500 (step S1403). Then, the height information of each vertex of the rectangle data 501 to 509 is calculated (step S1404), and the calculated height information is added to the coordinate value in the height direction of each vertex of the rectangle data 501 to 509 as shown in FIG. 6 (step S1405). Thus, the simple-three-dimensional ground object 600 shown in FIG. 6 can be created.

Figure 15:
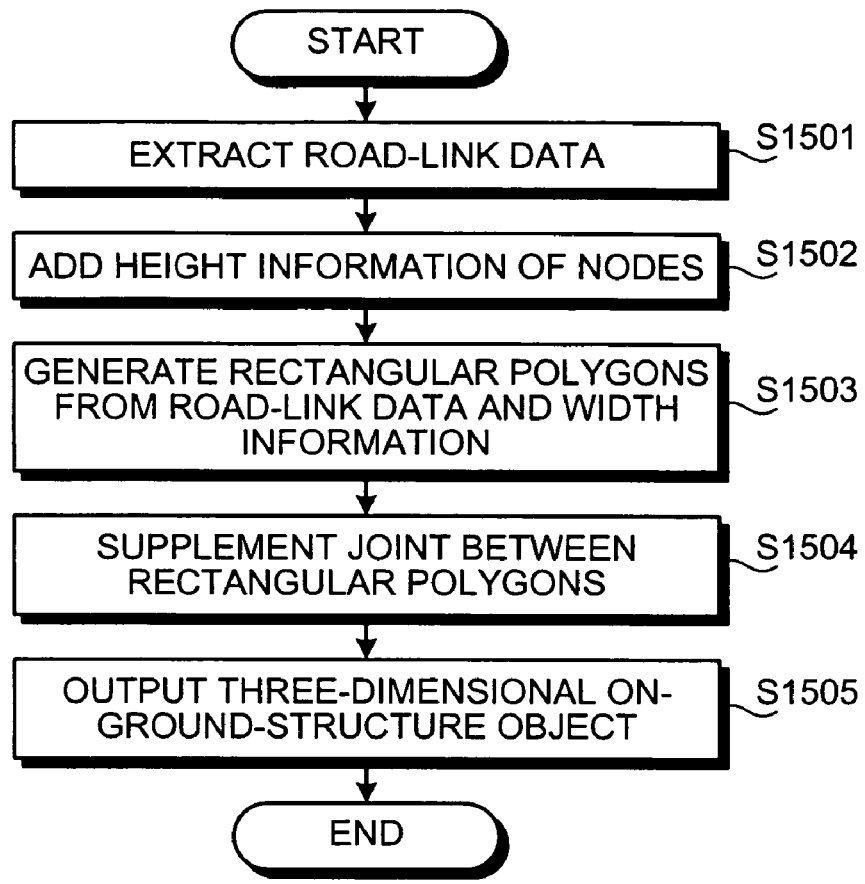
FIG. 15 is a flowchart of a procedure of a the three-dimensional on-ground-structure object creating process.

A procedure of creating the three-dimensional on-ground-structure object 900 shown at step S1303 in FIG. 13 will be explained. FIG. 15 is a flowchart of a procedure of creating the three-dimensional on-ground-structure object 900. As shown in FIG. 15, the road-link data within the arbitrary range 301 shown in FIG. 3 is extracted (step S1501). Then, the height information of the nodes 401 to 405 present in the rectangle data 501 to 509 of the two-dimensional rectangle information 500 corresponding to the split-three-dimensional rectangle data 601 to 609 are calculated with the method shown in FIG. 7, and added to the nodes 401 to 405 (step S1502). Furthermore, the predetermined amount of height may be added to the height information.

Then, the three-dimensional road-link data is created by referring to the original road-link data 400 and connecting the nodes 401 to 405 to which the height information are added, the rectangular polygons 801 to 804 are created by extending the three-dimensional road-link data using the width information of the road-link data 400 (step S1503). Then, as shown in FIG. 9, the joint among the rectangular polygons 801 to 804 is supplemented (step S1504). Thus, the three-dimensional on-ground-structure object 900 shown in FIG. 10 can be created. Then, the three-dimensional on-ground-structure object 900 is output to the three-dimensional map information creating unit 106 (step S1505).

Figure 16:
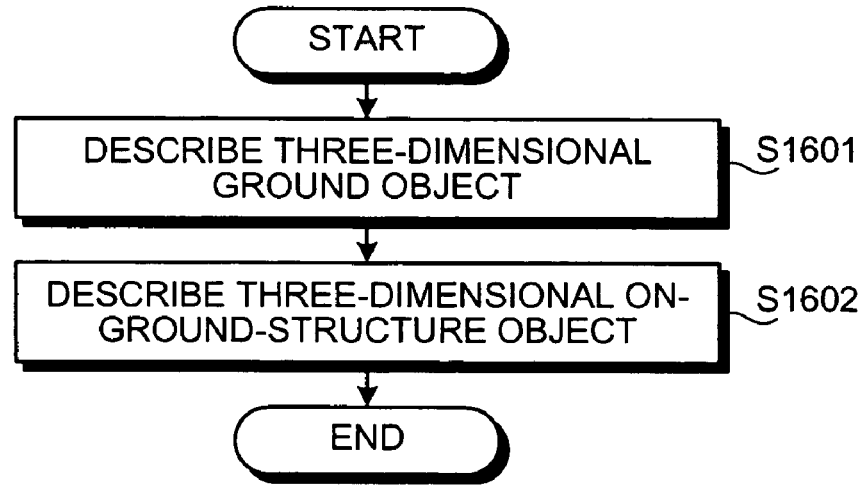
FIG. 16 is a flowchart of a procedure of a three-dimensional map information creating process.

A procedure of creating the three-dimensional map information shown at step S1304 in FIG. 13 will be explained. FIG. 16 is a flowchart of a procedure of creating the three-dimensional map information. As shown in FIG. 16, the three-dimensional ground object 200 is drawn (step S1601). Then, the three-dimensional on-ground-structure object 900 created at step S1303 (step S1602). Thus, the three-dimensional map information 1000 in which the three-dimensional on-ground-structure object 900 is drawn superimposed on the three-dimensional ground object 200 can be drawn.

According to the first example, the three-dimensional on-ground-structure object 900 indicating the state of undulation of the two-dimensional on-ground structure object 800 that indicates an on-ground structure such as a road instituted on a ground surface, can be created using the simple-three-dimensional ground object 600 having less amount of data than the three-dimensional ground object 200.

Therefore, the calculating process can be simplified compared to the case when the three-dimensional on-ground-structure object is created using the three-dimensional ground object 200, thereby improving processing capacity. Furthermore, the two-dimensional on-ground-structure object 800 such as a road can be artificially merged with the three-dimensional ground object 200 that realistically indicates a state of a ground, thereby decreasing amount of data and the realistic three-dimensional map information being able to be created.

Second Example

Figure 17:
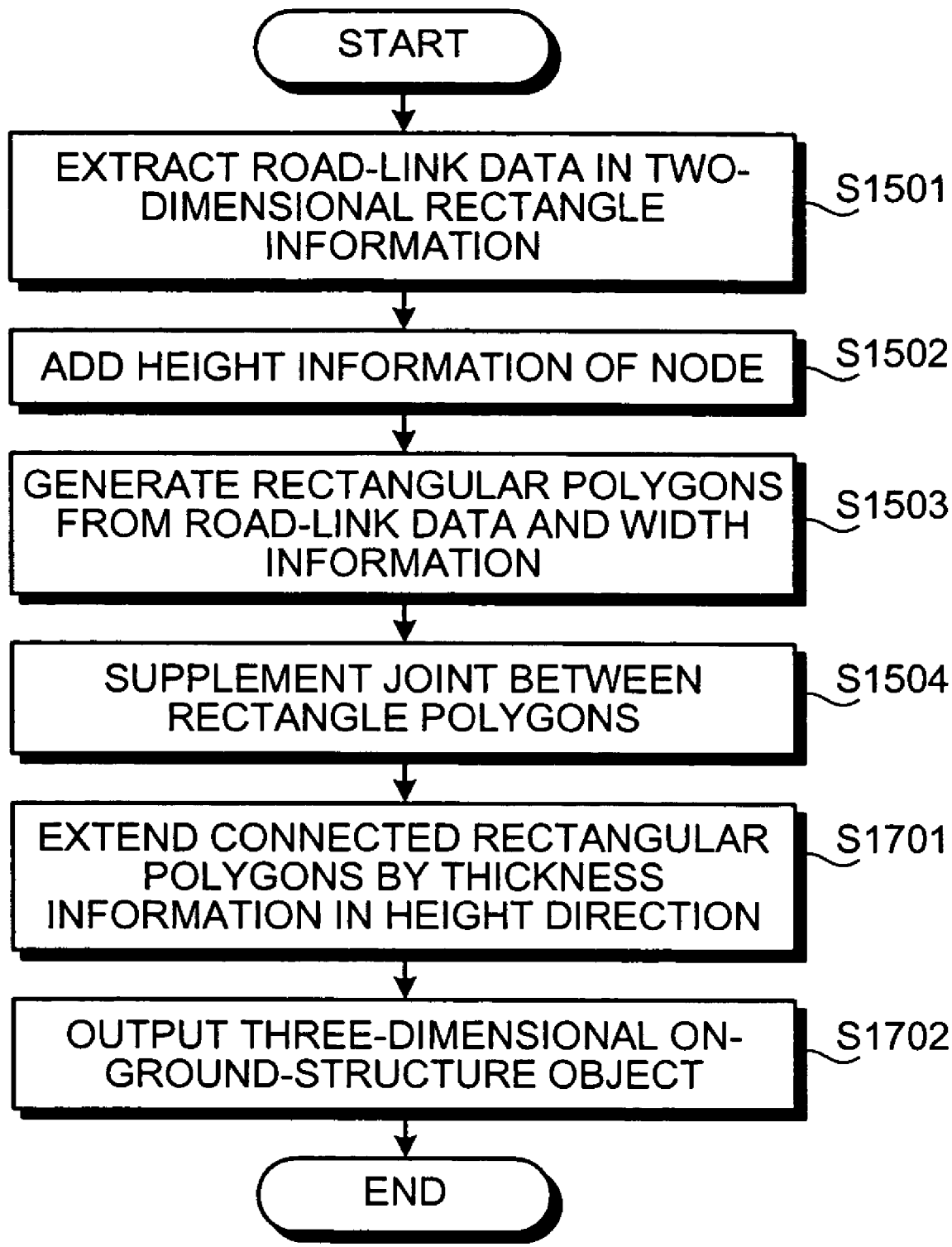
FIG. 17 is a flowchart of a procedure of creating a simple-three-dimensional on-ground-structure object according to a second example.

A second example of the first embodiment will be explained. A procedure in a case when the thickness is added to the rectangular polygons 801 to 804 in the flowchart of the procedure of creating the three-dimensional on-ground-structure object 900 shown in the first example (refer to FIG. 15), is explained in the second example. FIG. 17 is a flowchart of a procedure of creating the simple three-dimensional on-ground-structure object according to the second example. Note that like step numerals refer to like steps shown in FIG. 15 and the explanation thereof is omitted.

As shown in FIG. 17, after step S1504, the connected polygons 801 to 804 are extended in the height direction by the thickness information (step S1701). Then, the three-dimensional on-ground-structure object 910 that is the polygons 801 to 804 to which the thickness has been added, is output (step S1702).

According to the second example, the height of the three-dimensional on-ground-structure object 910 becomes equal to or more than that of the ground surface of the three-dimensional ground object 200, and the three-dimensional on-ground-structure object 910 can be displayed superimposing with the three-dimensional ground object 200. Furthermore, the gap between the three-dimensional on-ground-structure object 910 and the three-dimensional ground object 200 can be hided by the thickness. Furthermore, the thickness information can be added to the two-dimensional on-ground-structure object stored in advance.

Third Example

Figure 18:
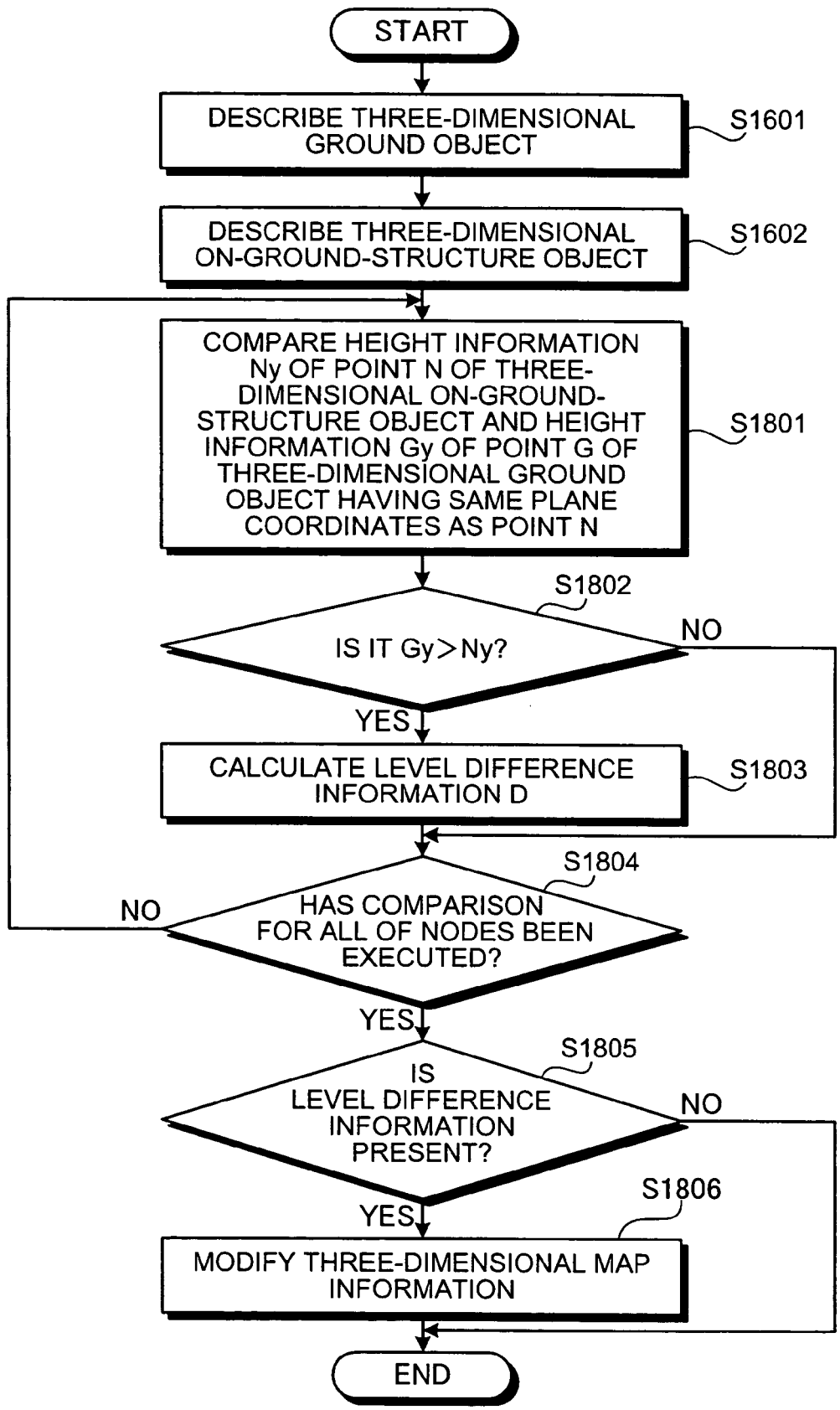
FIG. 18 is a flowchart of a procedure of a three-dimensional map information creating process according to a third example.

The third example of the first embodiment will be explained. A procedure of feeding back a state of the description of the three-dimensional on-ground-structure object to automatically modify in the flowchart of the procedure of creating three-dimensional map information shown in the first example (refer to FIG. 16), is explained in the third example. FIG. 18 is a flowchart of a procedure of creating the three-dimensional map information according to the third example. Note that like step numerals refer to like steps shown in FIG. 16 and the explanation thereof is omitted.

After step S1602, the height information Ny of the point N indicating the nodes 401 to 405 of the three-dimensional on-ground-structure object 900 (or 910) and height information Gy of a point G of the three-dimensional ground object 200 that has the same plane coordinates as the point N are compared (step S1801). When the height information Gy is larger than the height information Ny (step S1802: YES), a part of the three-dimensional on-ground-structure object 900 is covered and hided by the three-dimensional ground object 200. Therefore, in this case, the level difference information D (D=Gy−Ny) is calculated (step S1803).

Then, after step S1803 or step S1802: NO, it is judged whether the comparison for all of the nodes 401 to 405 of the three-dimensional on-ground-structure object 900 (or 910) has been executed (step S1804). When it is judged that the comparison for all of the nodes 401 to 405 of the three-dimensional on-ground-structure object 900 (or 910) has not been executed (step S1804: NO), the process proceeds to step S1801. On the other hand, when the comparison for all of the nodes 401 to 405 has been executed (step S1804: YES), it is judged whether the level difference information D is present (step S1805).

When the level difference information D is present (step S1805: YES), the three-dimensional map information is modified using the level difference information calculated (step S1806). More specifically, when it is judged that the height information Ny is smaller than the height information Gy, the three-dimensional map information 1000 (or 1100) is modified by adding the level difference information D to the height information Ny and describing the three-dimensional on-ground-structure object 900 (or 910) again. On the other hand, when the level difference information D is not present (step S1805: NO), the process ends there. According to the third example, the three-dimensional map information 1000 (or 1100) can be automatically modified and realistically expressed by feeding back the state of the description of the three-dimensional map information 1000 (or 1100).

Second Embodiment

A navigation device according to the second embodiment of the present invention will be explained. The navigation device is a navigation device in which each of the functional configurations 101 to 108, 111 to 114, and 131 to 134 of the map creation device 100 according to the first embodiment are installed.

(Hardware Configuration of Navigation Device)

Figure 19:
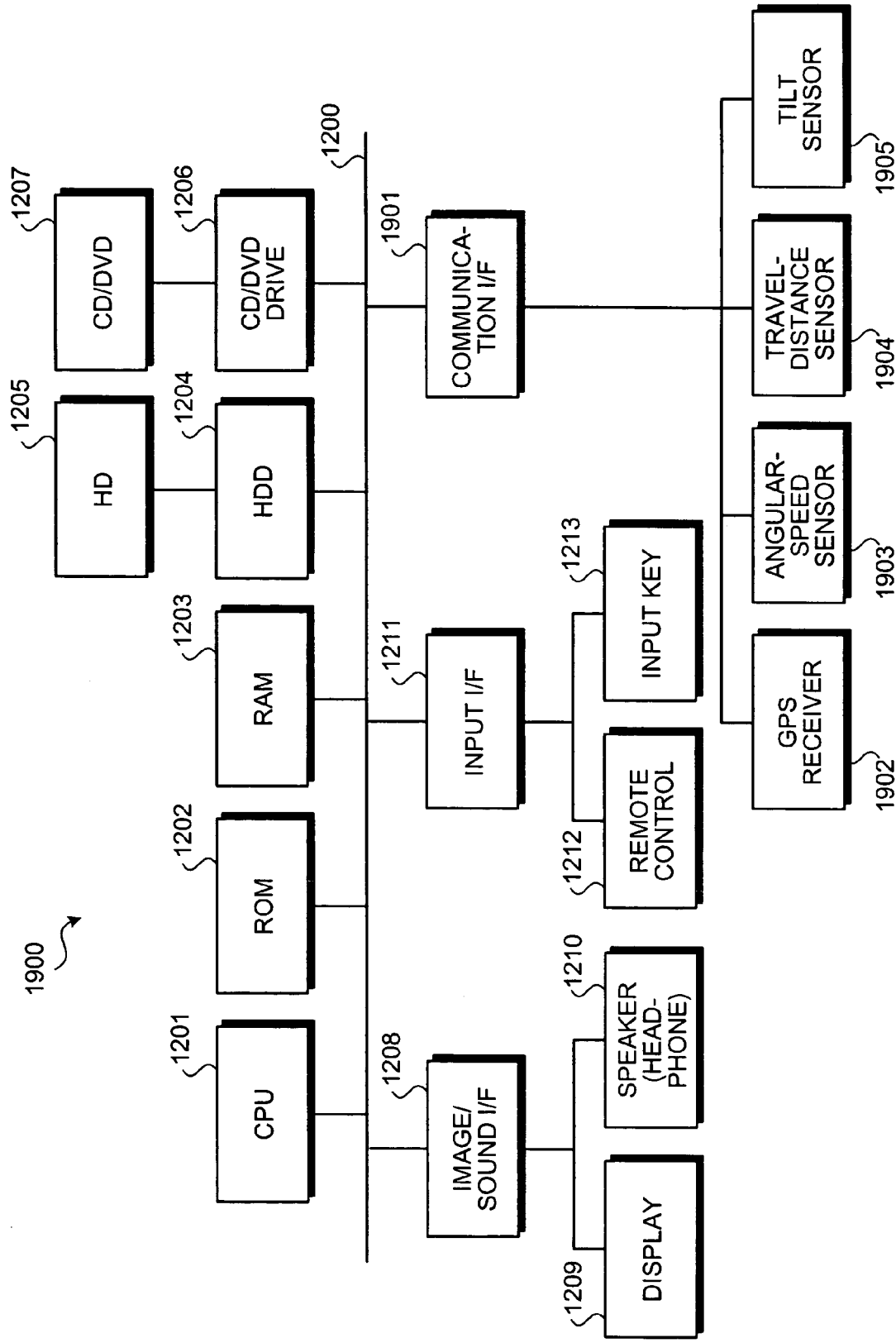
FIG. 19 is a block diagram of a hardware configuration of a navigation device according to a second embodiment of the present invention.

A hardware configuration of the navigation device according to the second embodiment of the present invention will be explained. FIG. 19 is a block diagram of the hardware configuration of the navigation device according to the second embodiment of the present invention. Note that like reference characters refer to like components shown in FIG. 12, and the explanation thereof is omitted.

In the navigation device 1900 shown in the FIG. 19, a communication I/F 1901 inputs various data output from a GPS (Global Positioning System) receiver 1902, an angular-speed sensor 1903, a travel-distance sensor 1904, and a tilt sensor 1905.

The GPS receiver 1902 is for obtaining a geometric location against a GPS satellite by receiving a radio wave from the GPS satellite, and the location can be measured anywhere on the earth. The measurement is executed using an L1 radio wave being a carrier at 1.575.42 MHz including a C/A (Coarse and Access) code and a navigation message as the radio wave. The bit rate of the C/A code is 1.023 Mbps, and the length of the code is 1023 bit=1 ms. The bit rate of the navigation message is 50 bps, the length of the code includes sub-frames of 300 bit=6 s and main-frames of 1500 bit=30 s, where 5 sub-frames are equal to 1 main-frame, and 25 main-frames equal to 1 master-frame. In other words, the GPS receiver 1902 receives the radio wave from the GPS satellite to output the GPS measurement data and the absolute direction data in the traveling direction of the moving object.

The angular-speed sensor 1903 detects the angular-speed when the moving object is turning, and outputs the angular-speed data and relative direction data. The travel-distance sensor 1904 calculates the pulse number per rotation of the wheel by counting the pulse-number of a pulse signal with a predetermined cycle output in accordance with rotation of the wheel, and outputs travel-distance data based on the pulse number per rotation of the wheel. The tilt sensor 1905 detects tilt-angle data of a road, and outputs tilt-angle data.

(Functional Configuration of Navigation Device)

Figure 20:
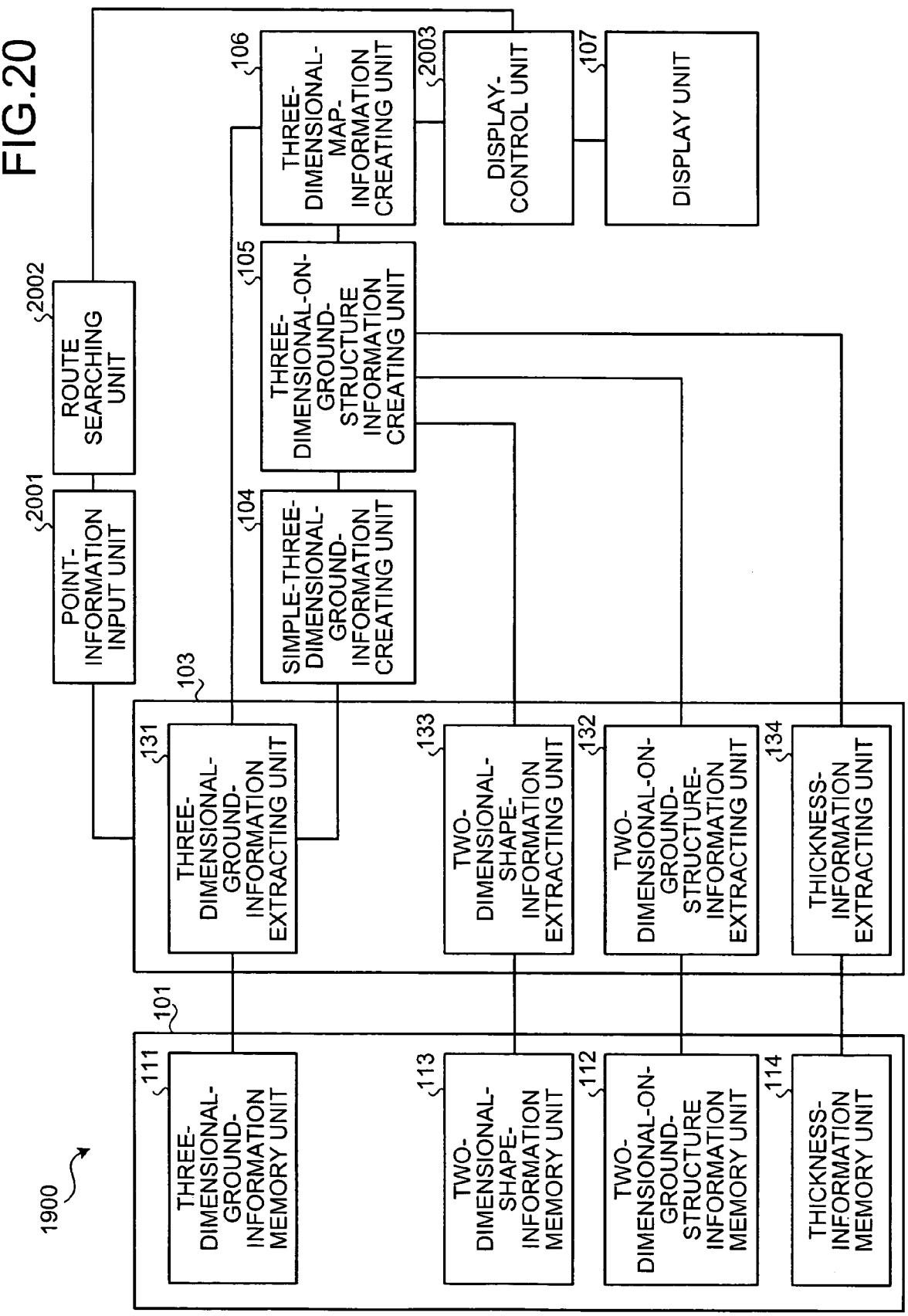
FIG. 20 is a block diagram of a functional configuration of the navigation device according to the second embodiment of the present invention.

A functional configuration of the navigation device 1900 according to the second embodiment of the present invention will be explained. FIG. 20 is a block diagram of the functional configuration of the navigation device 1900 according to the second embodiment of the present invention. Note that like reference characters refer to like components shown in FIG. 1, and the explanation thereof is omitted.

As shown in FIG. 20, a point-information input unit 2001 and a route searching unit 2002 are included in the navigation device 1900. The point-information input unit 2001 receives an input of point information indicating an arbitrary point. The arbitrary point may be a point input by the input operation of a user, or a current position of the device obtained by the calculating process. More specifically, in the case of the input operation of a user, a name, an address, etc. of an arbitrary point is input from the remote control 1212 or the input keys 1213 shown in FIG. 19.

When the current position of the device is input by the calculation process, the autonomous navigation device 1900 calculates a travel direction and a travel distance of the device based on the angular-speed data and the relative-direction data output by the angular-speed sensor 1903 shown in FIG. 19, the travel distance data output by the travel-distance sensor 1904, and the tilt-angle data output by the tilt sensor 1905, and calculates the current position by adding the travel direction and the travel distance to the reference point.

The GPS-type navigation device 1900 receives radio wave from the plural GPS satellites launched into the outer space, and calculates the current position of the mobile object using the three-dimensional surveying method or the two-dimensional surveying method based on a result of the reception. The GPS-type navigation device 1900 displays a position mark of the device and a map indicating vicinities of the current position based on the current position calculated. The navigation device may include both functions of the autonomous and the GPS-type. In any cases, a range of a map to be created is set based on the point information input by the point-information input unit 2001.

The route searching unit 2002 searches a route between arbitrary two points based on point information of the two points input by the point-information input unit 2001. More specifically, a route search from the device to the destination is executed when an input of the route search is received. Still more specifically, the route search is executed based on the point information (the latitude information and the longitude information) of the device and the destination input by the point information input unit 2001, and the three-dimensional map information corresponding to the point information. Note that the route search is executed with a known method.

The display-control unit 2003 controls the display, and displays the three-dimensional map information created by the three-dimensional-map-information creating unit 106. More specifically, the display-control unit 2003 displays the three-dimensional map object on the display by clipping the creation range. Furthermore, the display-control unit 2003 highlights, among the three-dimensional on-ground-structure object 900 (or the three-dimensional on-ground-structure object 910), an object corresponding to the route searched by the route searching unit 2002.

More specifically, the point-information input unit 2001, the route searching unit 2002, and the display-control unit 2003 are realized by the CPU 1201 that executes a program stored in a recording medium such as the ROM 1202, the RAM 1203, the HD 1205, the CD/DVD 1207, etc. shown in FIG. 19.

Fourth Example

Figure 21:
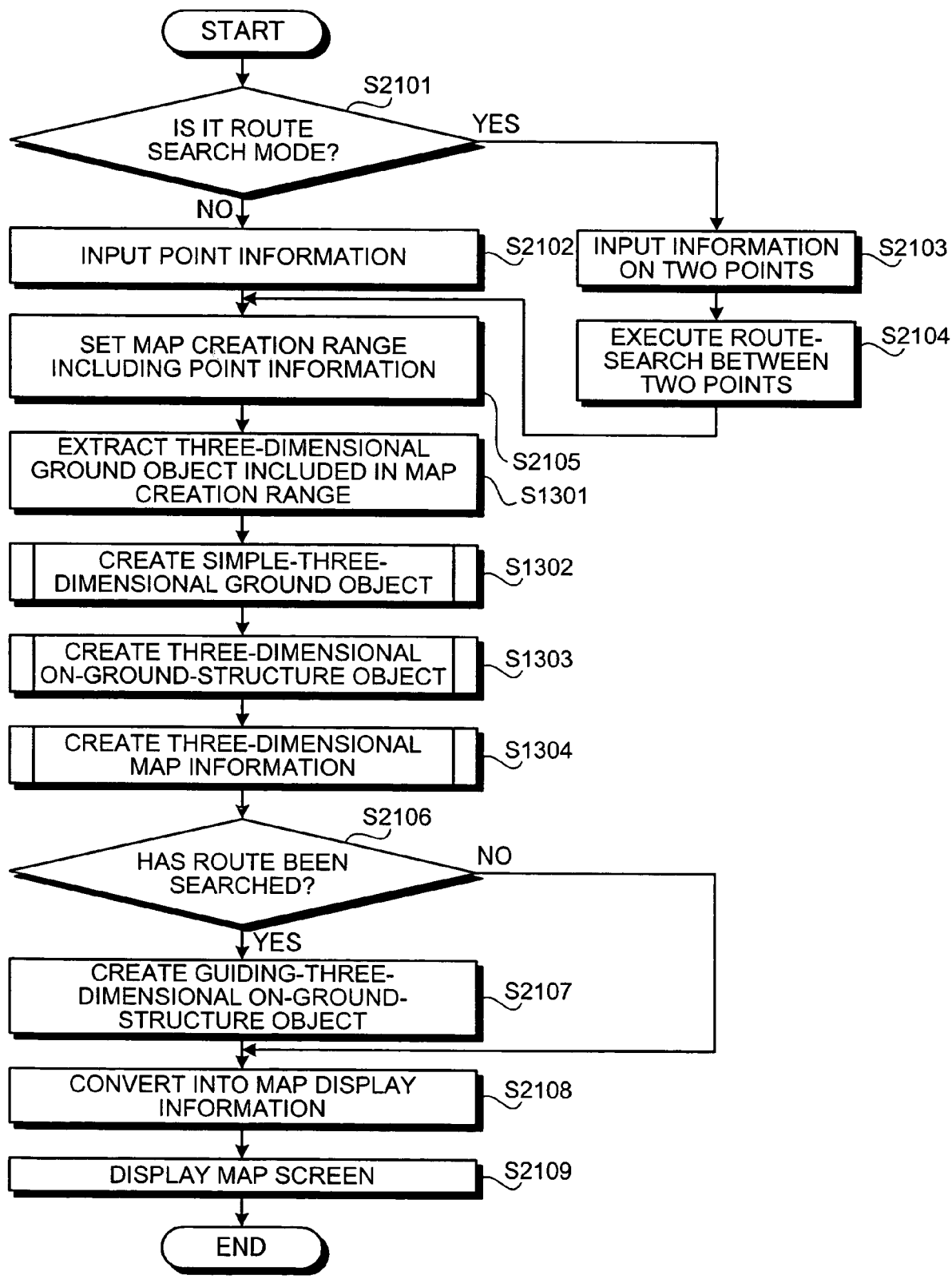
FIG. 21 is a flowchart of a procedure of a navigation process performed by the navigation device shown in FIG. 20.

A fourth example according to the second embodiment will be explained. A procedure of a navigation process performed by the navigation device 1900 shown in FIG. 20 is explained in the fourth embodiment. FIG. 21 is a flowchart of the procedure of the navigation process performed by the navigation device 1900 shown in FIG. 20. Note that like step numerals refer to like steps in the flowchart shown in FIG. 13, and the explanation thereof is omitted.

As shown in FIG. 21, when it is not the route search mode (step S2101: NO), point information indicating an arbitrary point is input (step S2102). On the other hand, when it is the route search mode (step S 2101: YES), point information between two points, for example, a current position and a destination point, are input (step S2103). Then, the route search between the two points is executed (step S2104).

After step S2102: NO or step S2104, a map creation range including the point information is set (step S2105). Then, the processes from step S1301 to step S1304 are executed. When the route search has been executed (step S2106: YES), the three-dimensional map information (or the three-dimensional on-ground-structure object 910) created at step S1305 is displayed, and a guiding-three-dimensional on-ground-structure object (or the three-dimensional on-ground-structure object 910) of the searched route is created (step S2107). The guiding-three-dimensional on-ground-structure object indicates a guide line along a road (the line indicating the road to be traveled).

Then, the three-dimensional map information of the range including the point information is converted into map display information (step S2108). More specifically, the coordinate conversion from the three-dimensional map information to the map display information that is viewed from a predetermined view position is executed. The view position may be a position that is the point information input to which the height information is added, or a position moved from the position by a predetermined amount. Then, a map screen is displayed based on the guiding-three-dimensional on-ground-structure object and the map display information converted (step S2109). On the other hand, when the route search has not been executed (step S2106: NO), the process proceeds to step S2108.

According to this example, map information of a vicinity of an arbitrary point can be displayed in three dimensions, and the two-dimensional on-ground-structure object 800 such as a road can be spatially displayed along the three-dimensional ground object 200. Therefore, undulation of a street can be visually recognized. Furthermore, it is possible to judge whether to pass the street based on the undulation of the street. Furthermore, it is possible to set a detour route when it is judged not to pass the street.

According to the first embodiment and the second embodiment above, the detailed-three-dimensional ground object 200 having a large amount of data is drawn, and the simple-three-dimensional ground object 600 having less amount of data than the three-dimensional ground object 200 is created for the two-dimensional on-ground-structure object 800. Then, the two-dimensional on-ground-structure object 800 is converted into the three-dimensional on-ground-structure object 900 using the simple-three-dimensional ground object 600, and drawn on the three-dimensional ground object 200. Thus, the two-dimensional on-ground-structure object 800 can be artificially merged with the three-dimensional ground object 200.

In other words, the simple-three-dimensional ground object 600 is used only for creating the three-dimensional on-ground-structure object 900 from the two-dimensional on-ground-structure object 800, and the three-dimensional ground object 200 is the ground object to be really displayed. Therefore, it is possible to realistically express an on-ground structure such as a road having the width corresponding to a real land feature on the three-dimensional ground object 200.

Furthermore, when the two-dimensional on-ground-structure object 800 is drawn on the three-dimensional ground object 200, the three-dimensional on-ground-structure object 900 can be created using the simple three-dimensional ground object 600. Therefore, it is not necessary to take all of the polygons of the three-dimensional ground object 200 into consideration, thereby decreasing an amount of calculation when the two-dimensional on-ground-structure object 800 is drawn on the three-dimensional ground object 200. As a result, the navigation device 1900 can be provided at low cost without an installation of a high performance CPU.

The map creation method and navigation method explained in the examples of the embodiments can be realized by executing a program provided in advance by a computer such as a personal computer or a work station. The program is stored on a computer-readable recording medium such as an HD, an FD, a CD-ROM, an MO disk, or a DVD, and is executed by being read from the recording medium by the computer. The program can also be a transmission medium that can be distributed via a network such as the Internet.

The invention claimed is:

1. A map creation device comprising:
a ground-information memory unit that stores a ground object expressing a three-dimensional shape of a ground;
a simple-ground-information creating unit that creates, based on the ground object, a simple ground object expressing the three-dimensional shape with less amount of data than the ground object;
an on-ground-structure-information creating unit that creates, based on the simple ground object, an on-ground-structure object expressing a three-dimensional shape of an on-ground structure that is present on a surface of the ground by adding height information to a two-dimensional on-ground-structure object expressing a two-dimensional shape of the on-ground structure; and
a map-information creating unit that creates map information in which the on-ground-structure object is superimposed on the ground object.

2. The map creation device according to claim 1, further comprising a two-dimensional-information memory unit that stores two-dimensional shape information including reference-line information indicating a reference-line of the two-dimensional shape of the on-ground structure, and width information indicating a width of the two-dimensional shape of the on-ground structure, the width in a direction perpendicular to the reference-line, wherein
the on-ground-structure-information creating unit creates the on-ground-structure object based on the two-dimensional shape information and the simple ground object.

3. The map creation device according to claim 1, wherein the simple-ground-information creating unit creates three-dimensional polygon information as the simple ground object by adding, based on the ground object, height information to vertices of polygons in two-dimensional polygon information indicating a two-dimensional plane split into a plurality of polygons.

4. The map creation device according to claim 3, wherein the simple-ground-information creating unit sets a mean value of height information of the ground object present around the vertices as the height information of the vertices.

5. The map creation device according to claim 3, wherein the on-ground-structure-information creating unit creates the on-ground-structure object by adding height information to the two-dimensional on-ground-structure object, based on the height information of the vertices.

6. The map creation device according to claim 1, wherein the on-ground-structure-information creating unit extracts, from the simple ground object, height information at a specific position of the two-dimensional shape of the on-ground structure, and creates the on-ground-structure object by adding the extracted height information to the specific position.

7. The map creation device according to claim 6, wherein the map-information creating unit adjusts the extracted height information to add to the specific position.

8. The map creation device according to claim 1, further comprising a thickness-information memory unit that stores thickness information indicating a thickness of the two-dimensional shape of the on-ground structure in a height direction, wherein
the on-ground-structure-information creating unit creates the on-ground-structure object by adding the thickness information to the two-dimensional on-ground-structure object.

9. The map creation device according to claim 8, wherein the map-information creating unit adjusts the thickness information to add to the two-dimensional on-ground-structure object.

10. A navigation device comprising:
a memory unit that stores at least one ground object expressing a three-dimensional shape of a ground;
a receiving unit that receives point information indicating at least one arbitrary point;
an extracting unit that extracts, from the ground object in the memory unit, a ground object expressing a three-dimensional shape of a ground within a predetermined range including the point information;
a simple-ground-information creating unit that creates, based on the extracted ground object, simple ground object expressing the three-dimensional shape with less amount of data than the extracted ground object;
a on-ground-structure-information creating unit that creates, based on the simple ground object, an on-ground-structure object expressing a three-dimensional shape of the on-ground structure that is present on a surface of the ground within the range including the point information by adding height information to a two-dimensional on-ground-structure object expressing a two-dimensional shape of the on-ground structure;
a map information creating unit that creates map information in which the on-ground-structure object is superimposed on the extracted ground object;
a display-information creating unit that creates, based on the map information, map display information viewed from a view position corresponding to a position of the point information; and
a display unit that displays a map screen based on the map display information.

11. The navigation device according to claim 10, further comprising a route searching unit that searches a route between two points included in the point information, wherein
the on-ground-structure-information creating unit creates the on-ground-structure information so as to emphasize an on-ground-structure object corresponding to the route.

12. A map creation method comprising:
with an input unit, inputting a ground object expressing a three-dimensional shape of a ground;
with an extraction unit, creating, based on the ground object, a simple ground object expressing the three-dimensional shape with less amount of data than the ground object;
with a creating unit, creating, based on the simple ground object, an on-ground-structure object expressing a three-dimensional shape of an on-ground structure that is present on a surface of the ground by adding height information to a two-dimensional on-ground-structure object expressing a two-dimensional shape of an on-ground structure; and
with a map unit, creating map information in which the on-ground-structure object is superimposed on the ground object, wherein a programmed computer provides each of the input unit, the extraction unit, the creating unit, and the map unit.

13. A computer-readable recording medium that stores therein a computer program making a computer execute:
inputting a ground object expressing a three-dimensional shape of a ground;
creating, based on the ground object, a simple ground object expressing the three-dimensional shape with less amount of data than the ground object;
creating, based on the simple ground object, an on-ground-structure object expressing a three-dimensional shape of an on-ground structure that is present on a surface of the ground by adding height information to a two-dimensional on-ground-structure object expressing a two-dimensional shape of an on-ground structure; and
creating map information in which the on-ground-structure object is superimposed on the ground object.

* * * * *